(12) United States Patent
Hoshino et al.

(10) Patent No.: US 10,962,065 B2
(45) Date of Patent: Mar. 30, 2021

(54) WET FRICTION MEMBER

(71) Applicant: AISIN KAKO KABUSHIKI KAISHA, Toyota (JP)

(72) Inventors: Ryohei Hoshino, Toyota (JP); Kazunari Asai, Toyota (JP)

(73) Assignee: AISIN KAKO KABUSHIKI KAISHA, Toyota (JP)

( * ) Notice: Subject to any disclaimer, the term of this patent is extended or adjusted under 35 U.S.C. 154(b) by 33 days.

(21) Appl. No.: 16/377,890

(22) Filed: Apr. 8, 2019

(65) Prior Publication Data

US 2019/0309811 A1 Oct. 10, 2019

(30) Foreign Application Priority Data

Apr. 10, 2018 (JP) .............................. JP2018-075753
Feb. 7, 2019 (JP) .............................. JP2019-021066

(51) Int. Cl.
*F16D 13/64* (2006.01)
*F16D 69/00* (2006.01)
*F16D 13/74* (2006.01)
*F16D 65/12* (2006.01)

(52) U.S. Cl.
CPC ........... *F16D 13/648* (2013.01); *F16D 13/64* (2013.01); *F16D 13/74* (2013.01); *F16D 69/00* (2013.01); *F16D 65/127* (2013.01)

(58) Field of Classification Search
CPC .......... F16D 13/72; F16D 13/74; F16D 13/64; F16D 13/648; F16D 65/121; F16D 65/122; F16D 65/127; F16D 65/128; F16D 69/00–2069/0491
See application file for complete search history.

(56) References Cited

U.S. PATENT DOCUMENTS

| 6,499,579 | B2 | 12/2002 | Ono et al. |
| 6,712,190 | B2 * | 3/2004 | Kitaori ............... F16D 13/648 188/264 B |
| 7,434,673 | B2 | 10/2008 | Muranaka et al. |
| 2001/0042668 | A1 | 11/2001 | Ono et al. |
| 2003/0051967 | A1 * | 3/2003 | Kitaori .................. F16D 65/12 192/70.12 |
| 2005/0217965 | A1 | 10/2005 | Muranaka et al. |

(Continued)

FOREIGN PATENT DOCUMENTS

| JP | 4-136524 A | 5/1992 |
| JP | 2001-295859 | 10/2001 |

(Continued)

OTHER PUBLICATIONS

Japanese Office Action dated Jun. 25, 2019 in Patent Application No. 2019-021066, 11 pages (with unedited computer generated English translation).

*Primary Examiner* — David R Morris
(74) *Attorney, Agent, or Firm* — Oblon, McClelland, Maier & Neustadt, L.L.P.

(57) ABSTRACT

A wet friction member includes a core plate formed in a flat ring shape; and a friction part arranged on a main surface of the core plate. The friction part is formed in such a manner that four kinds of segment pieces, which are a first piece, a second piece, a third piece, and a fourth piece, are repeatedly arranged in this arrangement order in a ring shape via oil grooves.

14 Claims, 19 Drawing Sheets

(56) References Cited

U.S. PATENT DOCUMENTS

| | | | | |
|---|---|---|---|---|
| 2006/0090979 A1* | 5/2006 | Asai | ............ | F16D 13/648 |
| | | | | 192/107 R |
| 2015/0362023 A1* | 12/2015 | Tohyama | ............ | F16D 69/00 |
| | | | | 192/70.12 |
| 2020/0158185 A1* | 5/2020 | Hoshino | ............ | F16D 13/72 |

FOREIGN PATENT DOCUMENTS

| JP | 2005-282648 | 10/2005 |
|---|---|---|
| JP | 2016-098901 | 5/2016 |

\* cited by examiner

[FIG.1A]
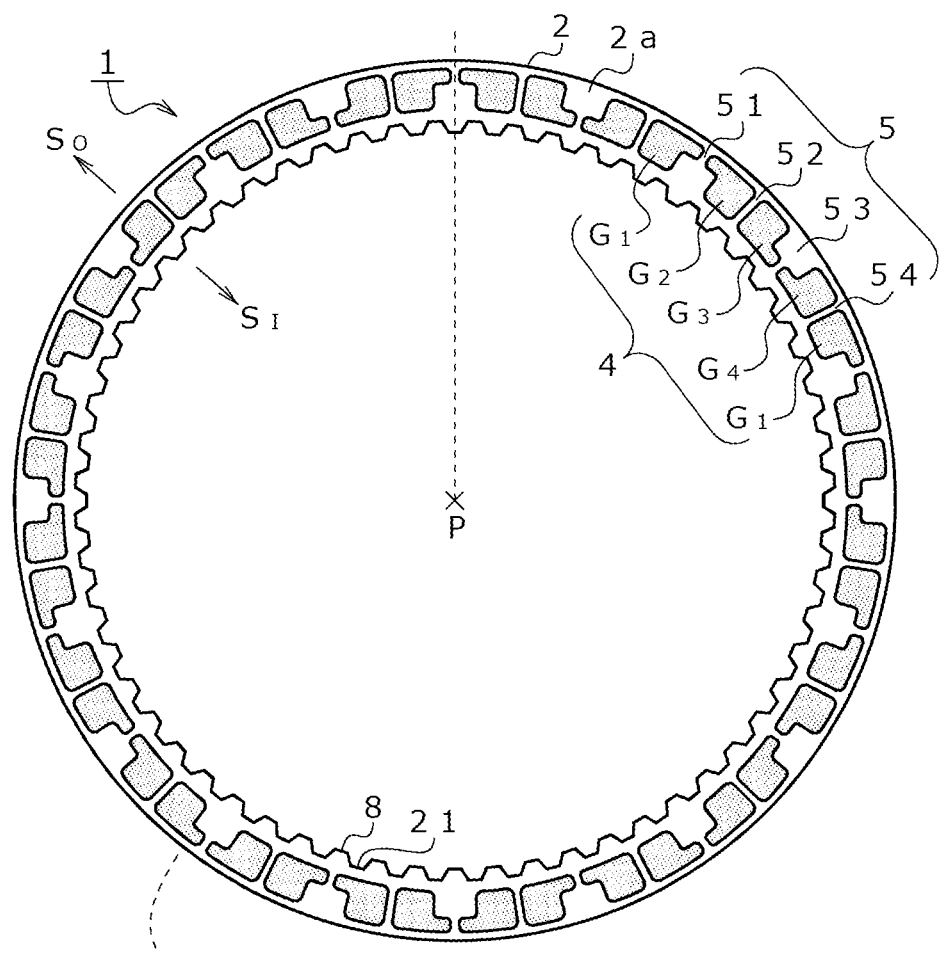
[FIG.1B]
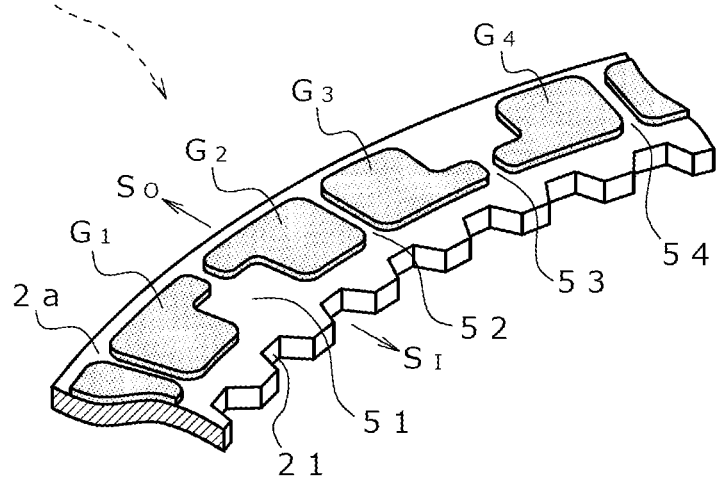

[FIG.2A]
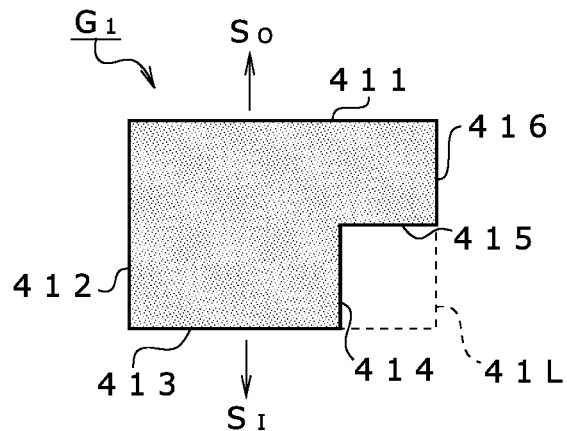
[FIG.2B]
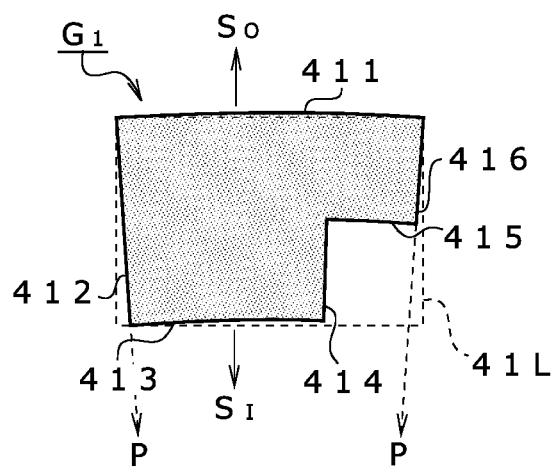
[FIG.2C]
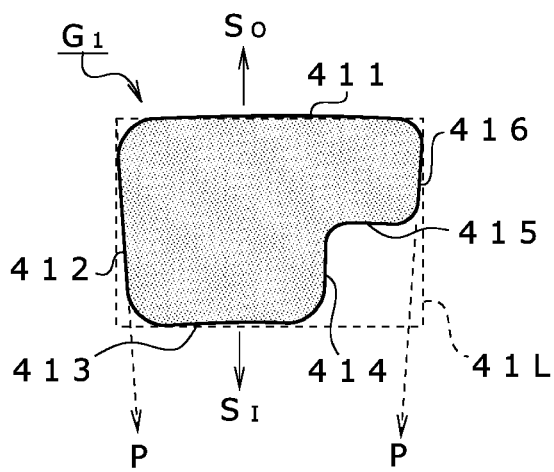

[FIG.3A]
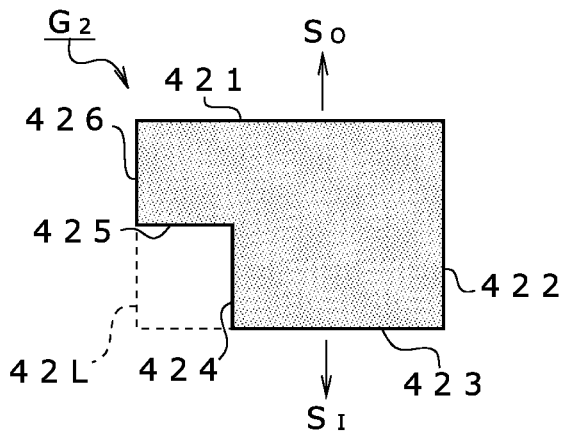
[FIG.3B]
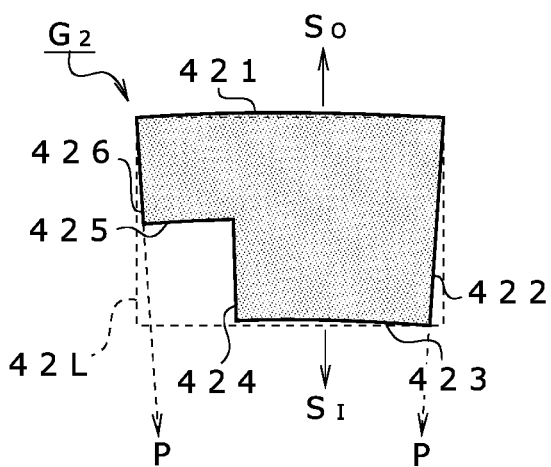
[FIG.3C]
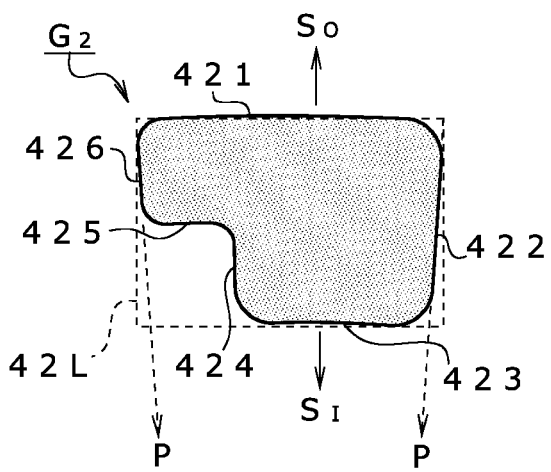

[FIG.4A]
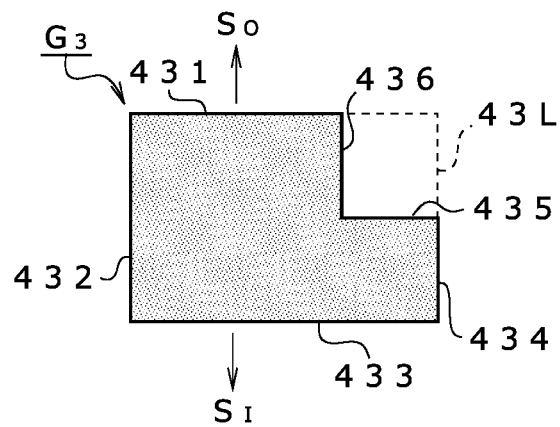
[FIG.4B]
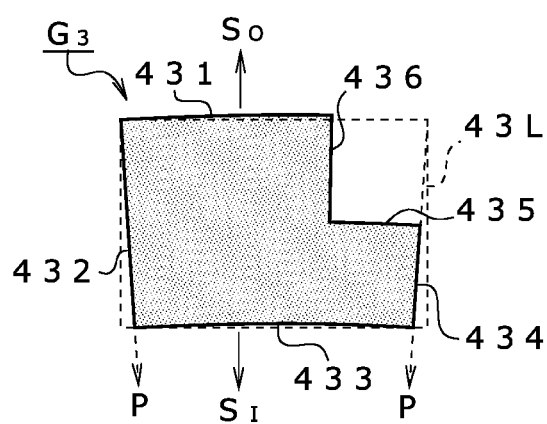
[FIG.4C]
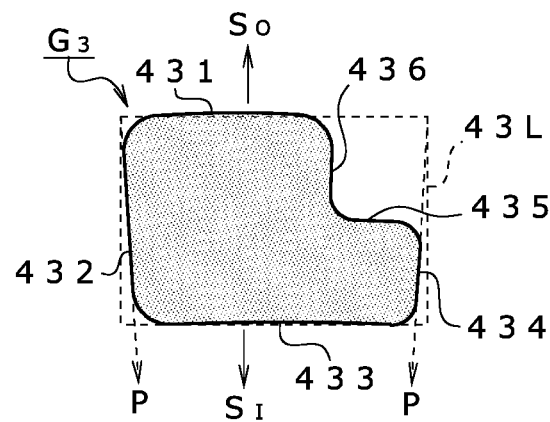

[FIG.5A]
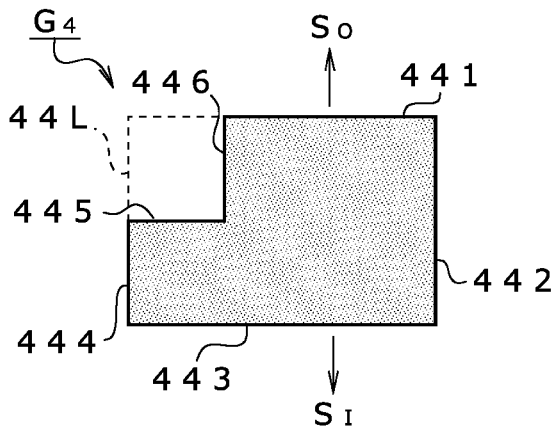
[FIG.5B]
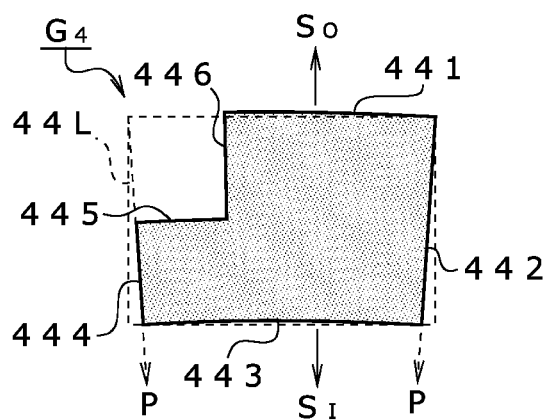
[FIG.5C]
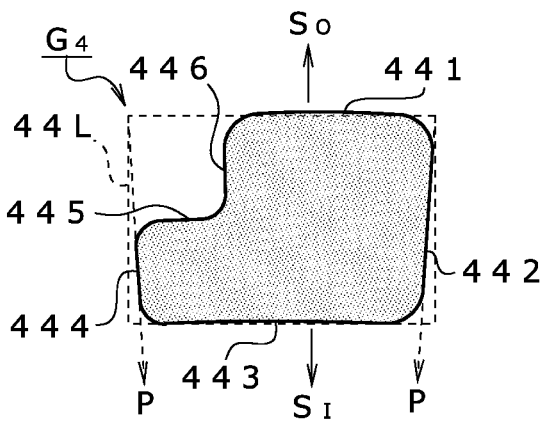

[FIG.6]
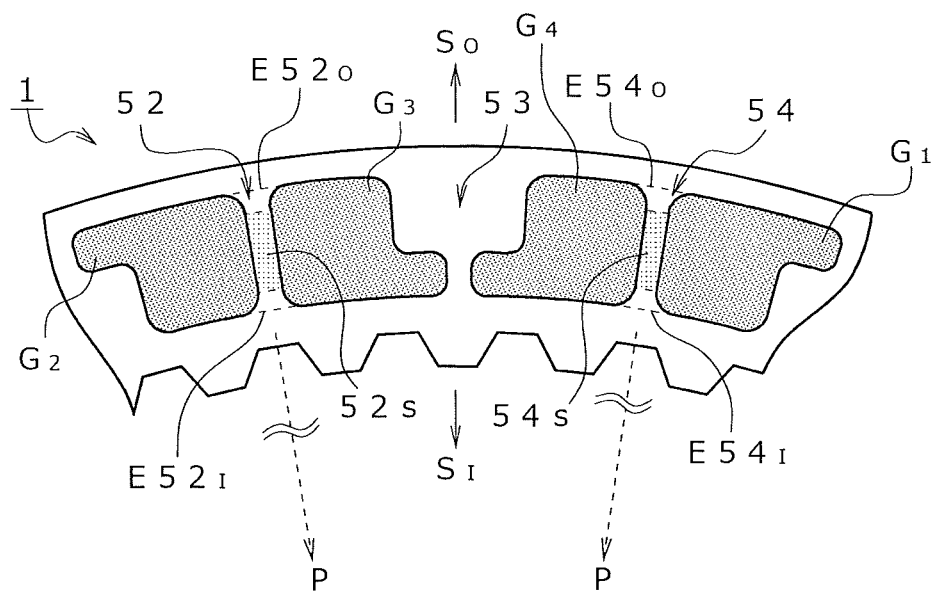
[FIG.7]
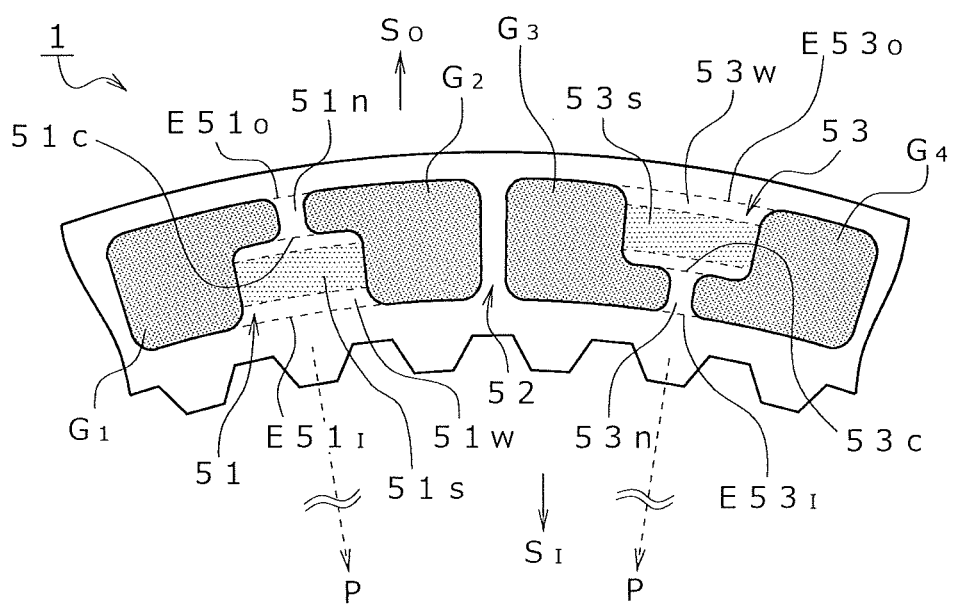

[FIG.8]
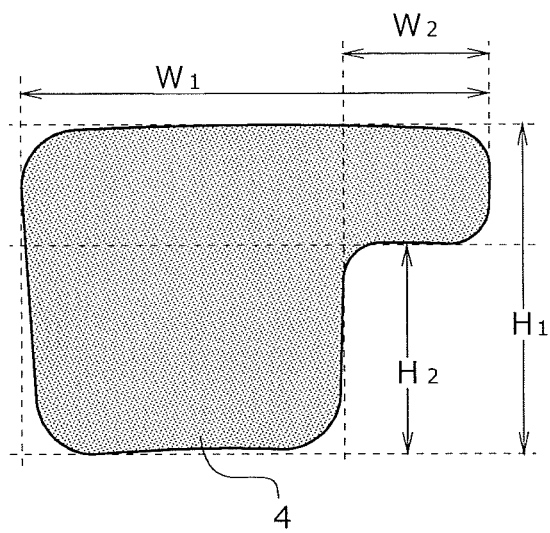
[FIG.9]
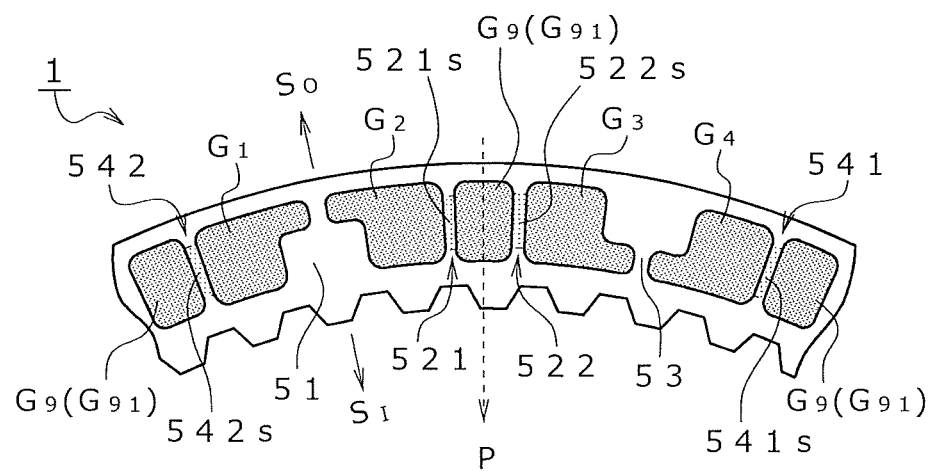

[FIG.10]
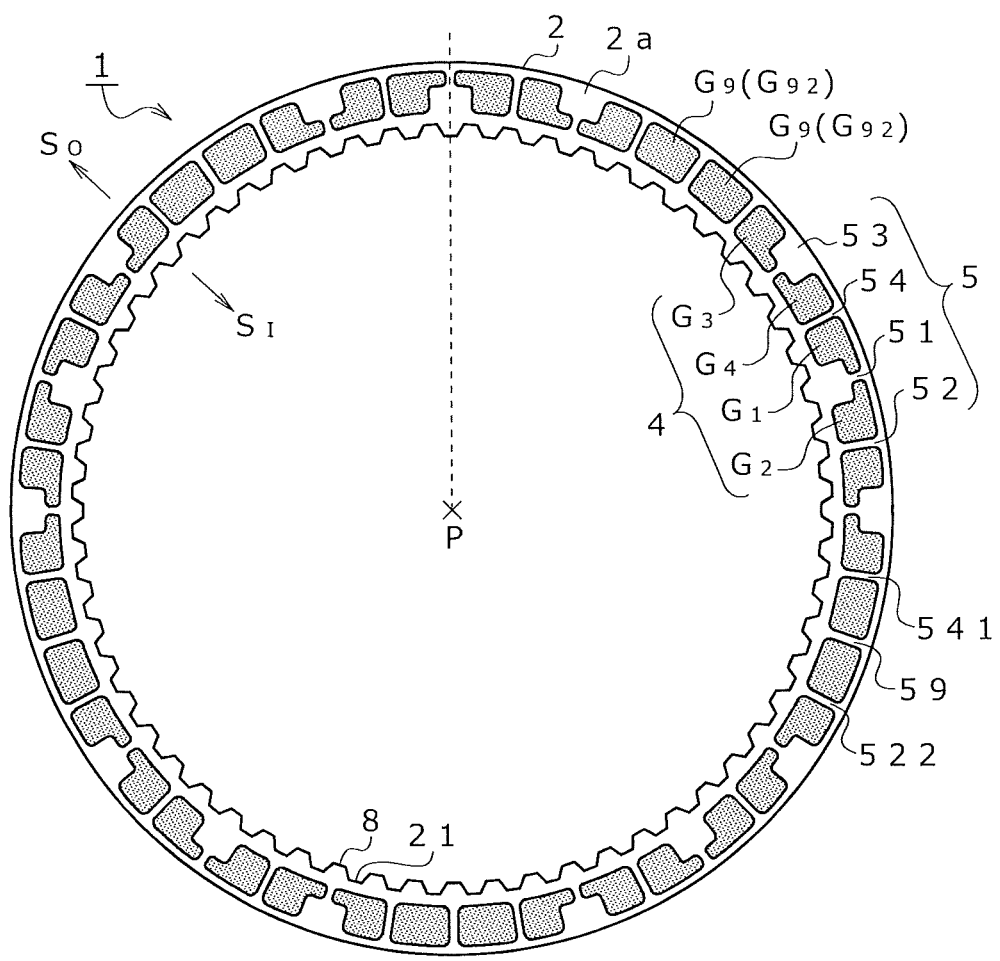

[FIG.11A]
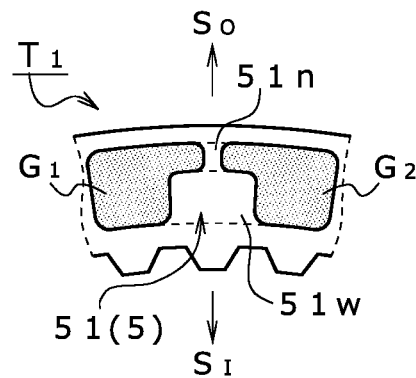
[FIG.11B]
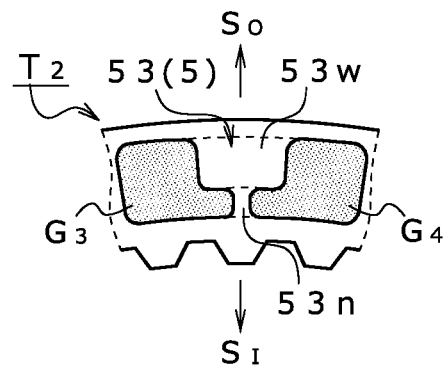
[FIG.12A]
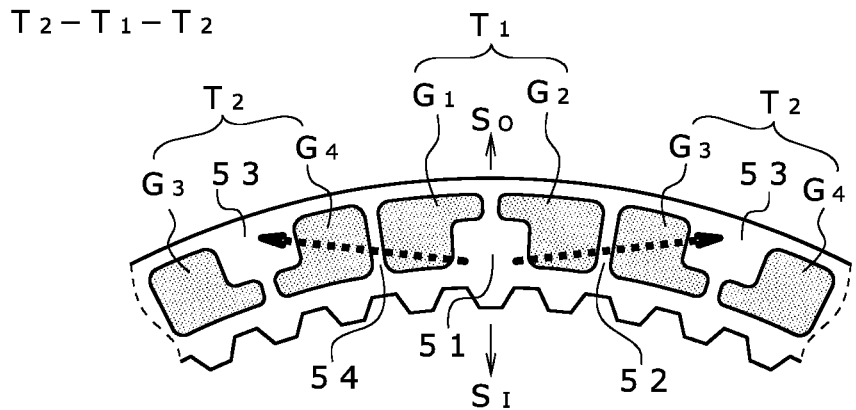
[FIG.12B]
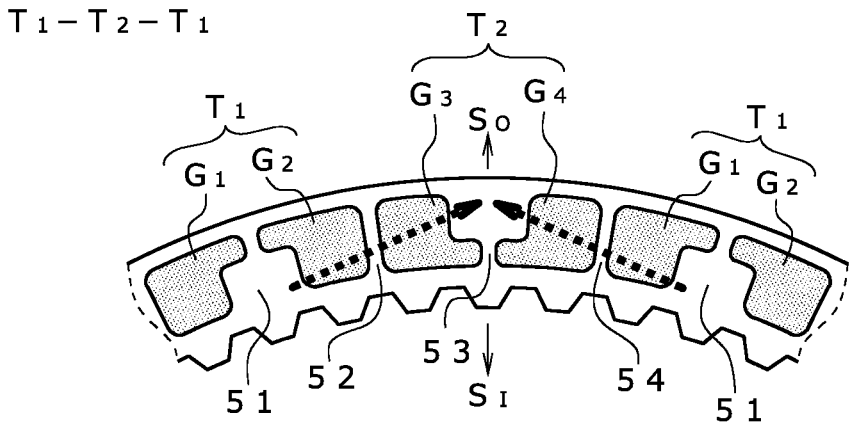

[FIG.13]
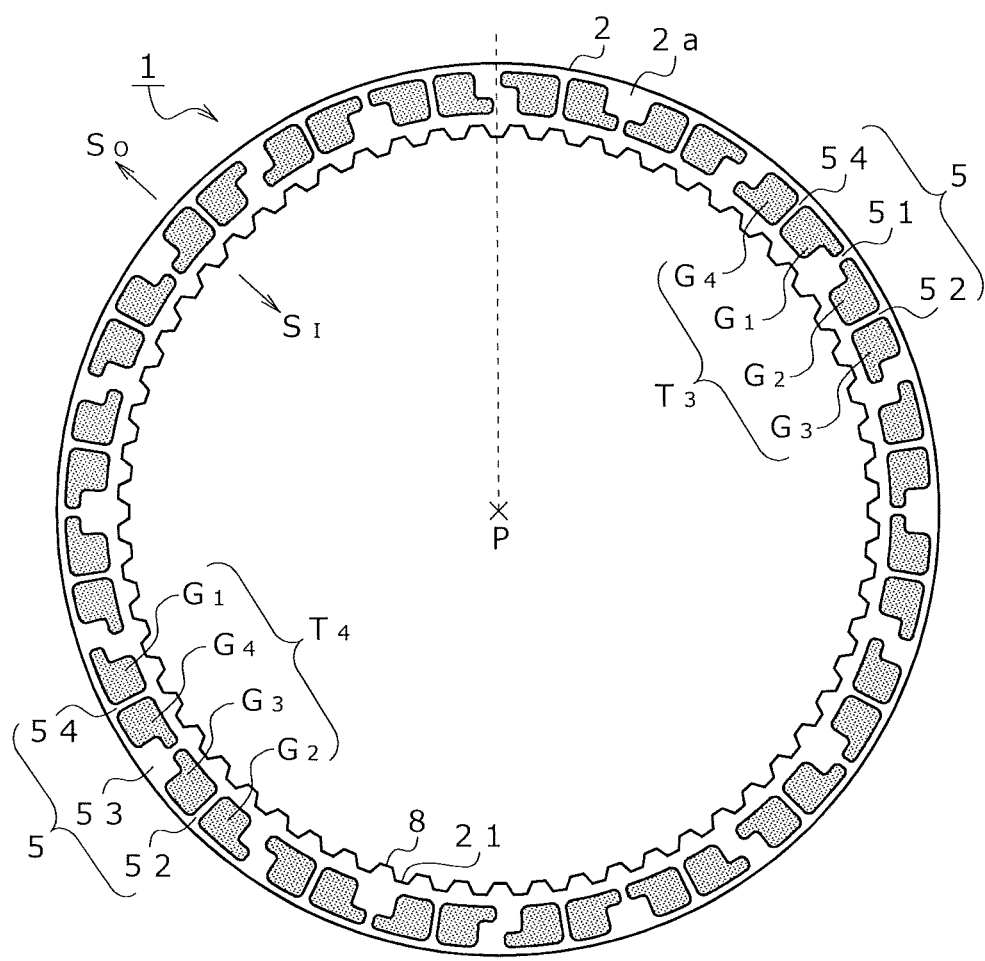

[FIG.14A]
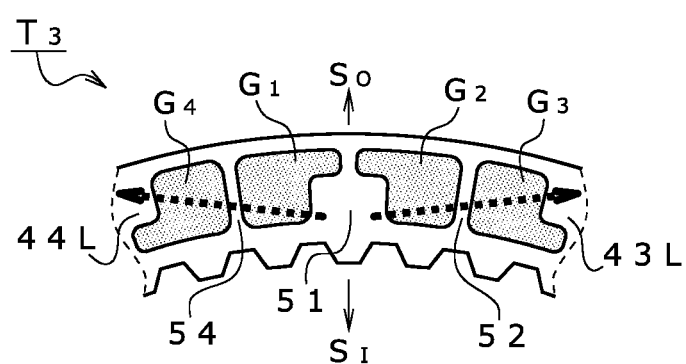
[FIG.14B]
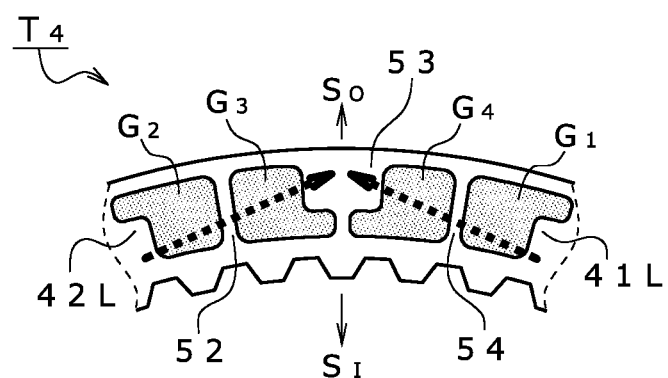

[FIG.15]
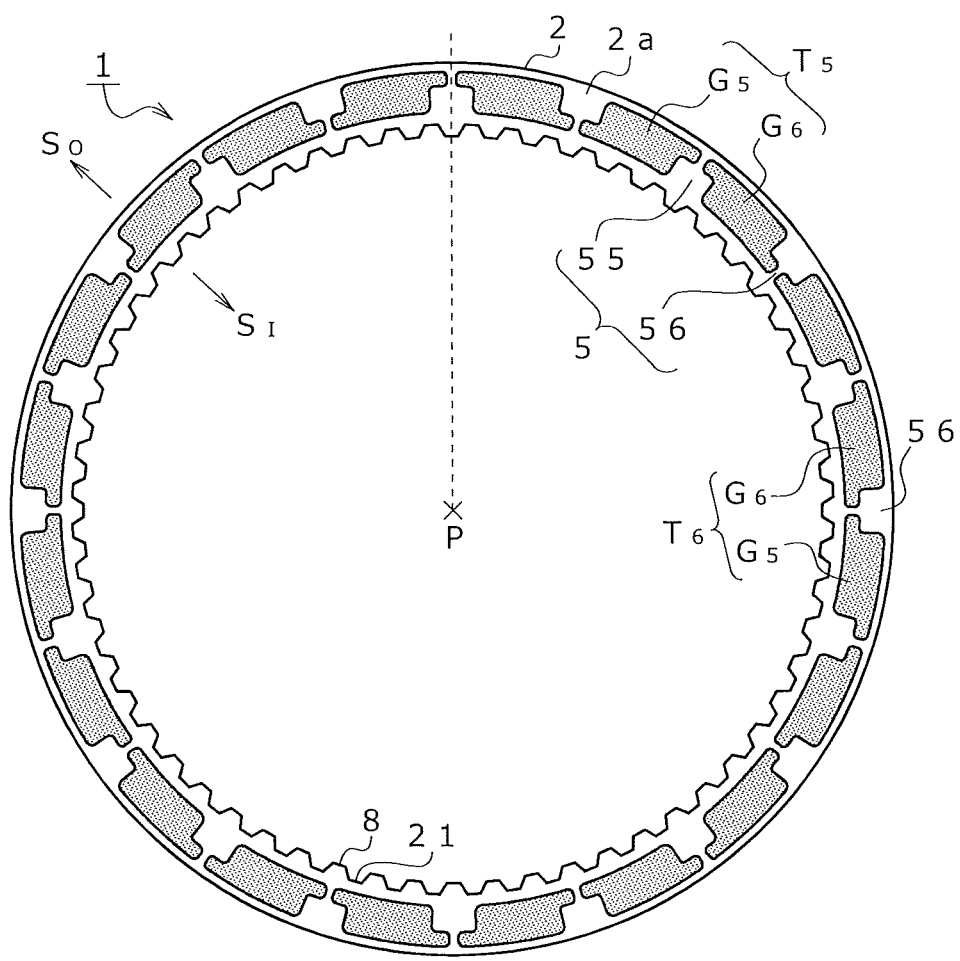

[FIG.16A]
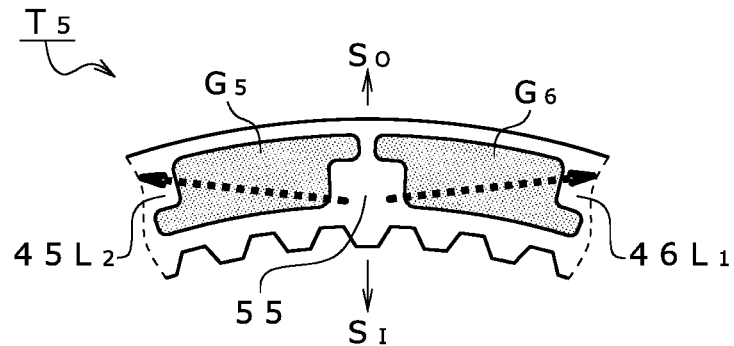
[FIG.16B]
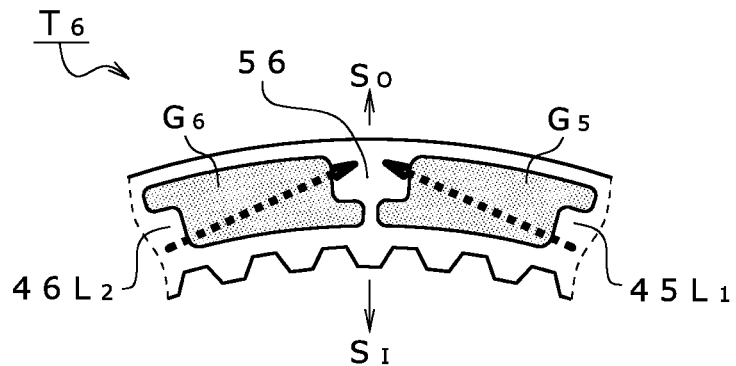
[FIG.17]
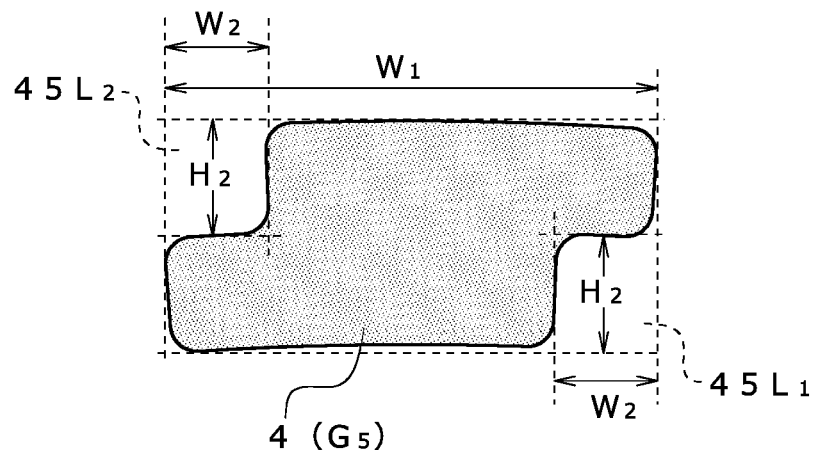

[FIG.18A]
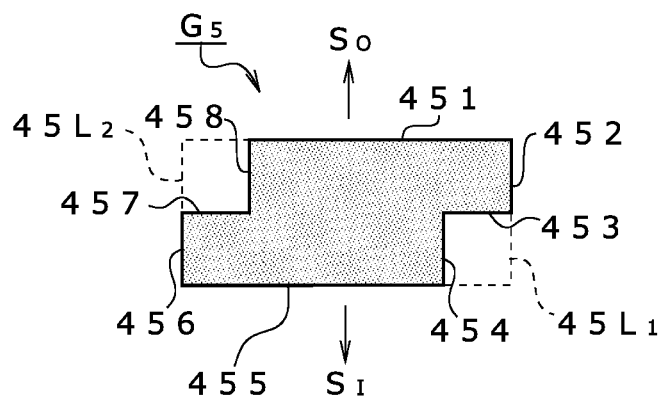
[FIG.18B]
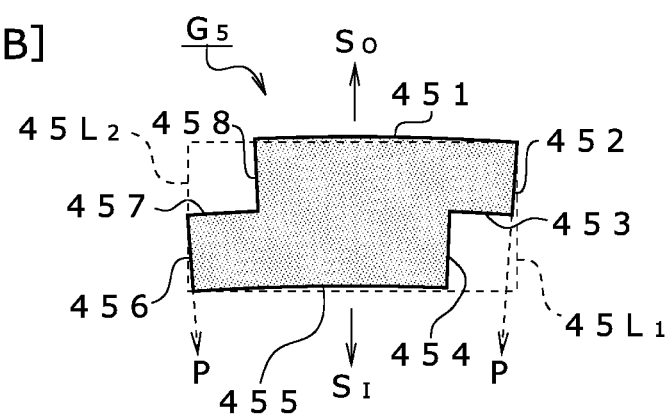
[FIG.18C]
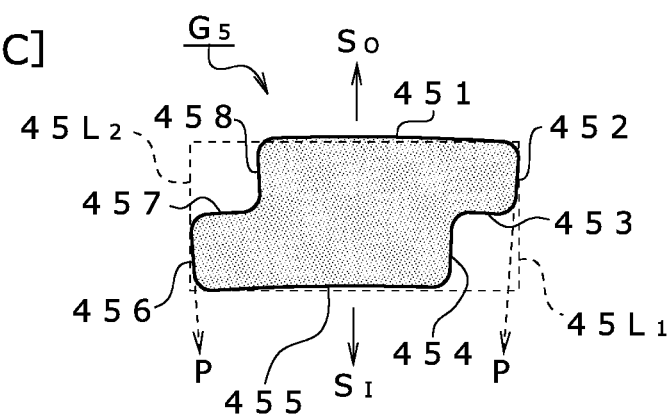

[FIG.19A]
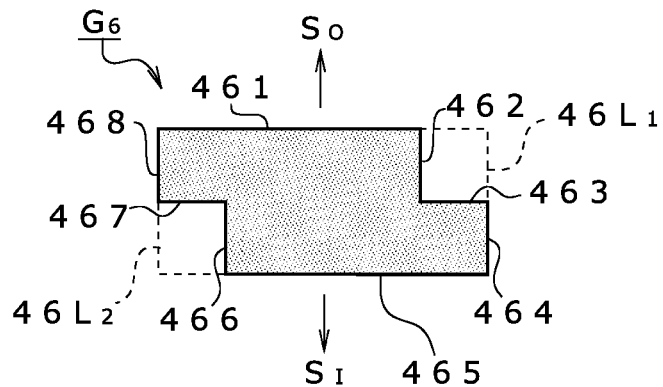
[FIG.19B]
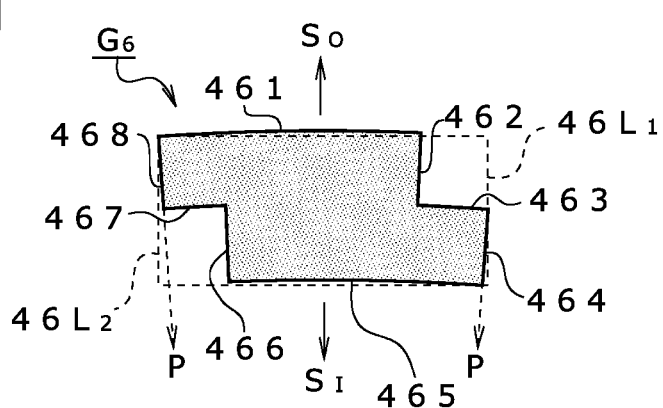
[FIG.19C]
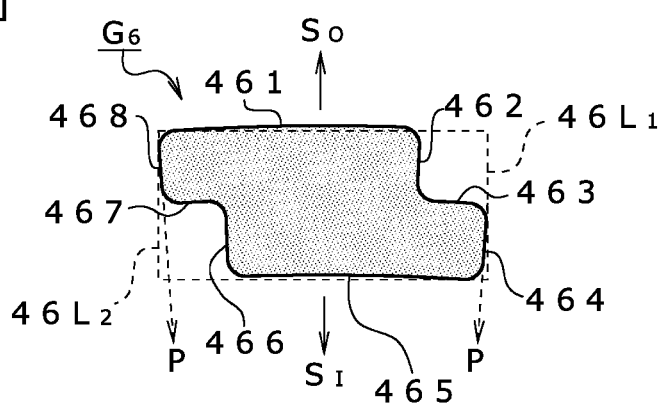

[FIG.20A]
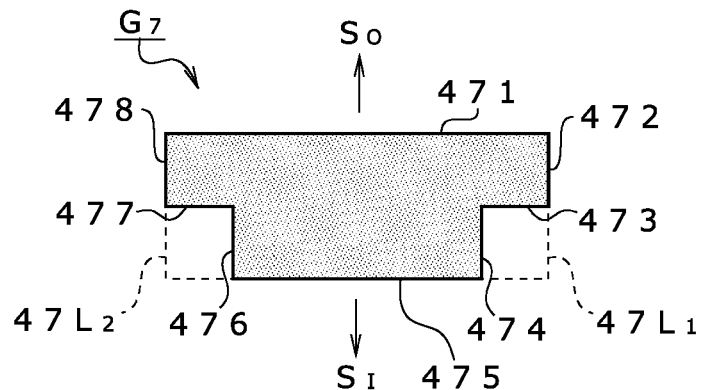
[FIG.20B]
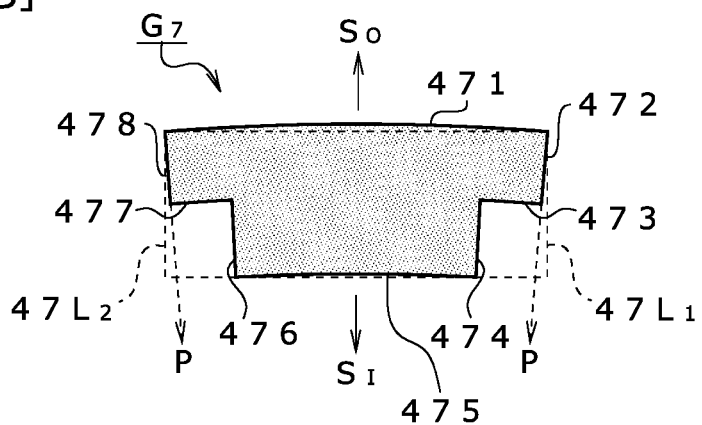
[FIG.20C]
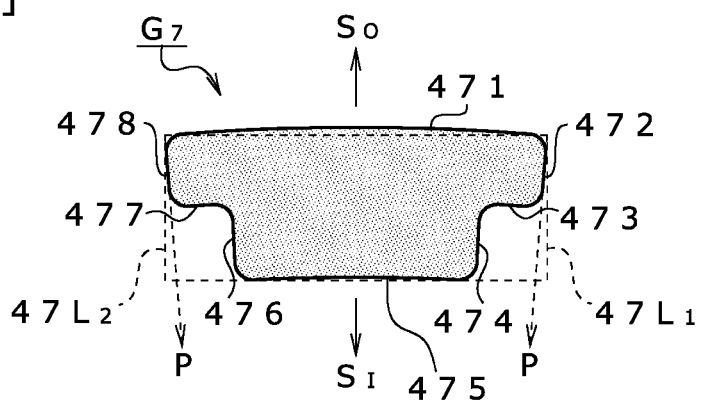

[FIG.21A]
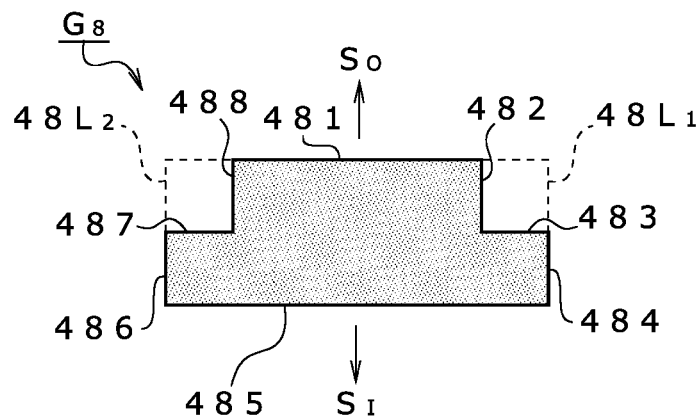
[FIG.21B]
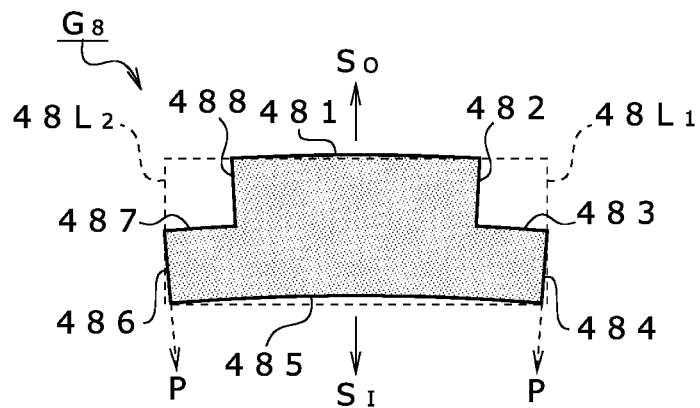
[FIG.21C]
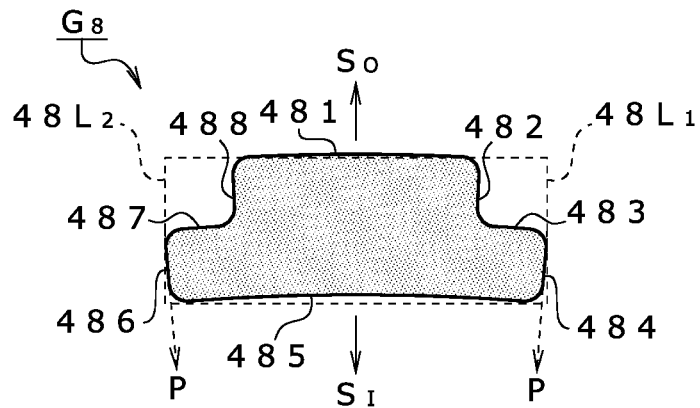

[FIG.22]
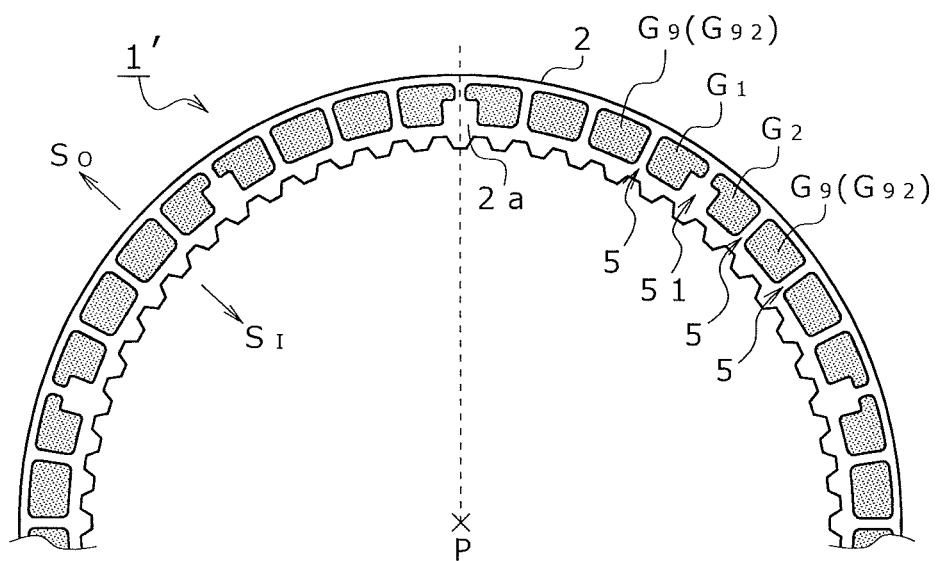
[FIG.23]
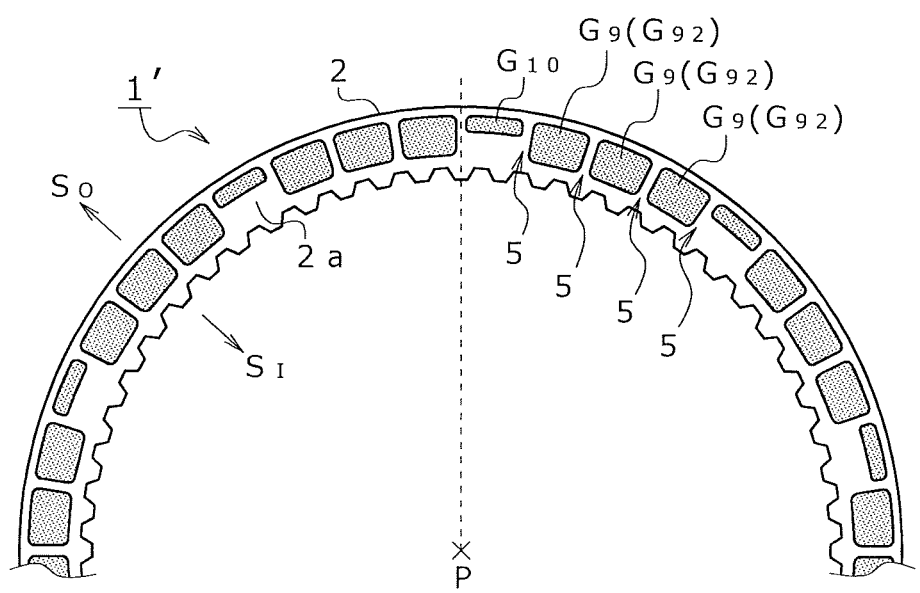

[FIG.24]
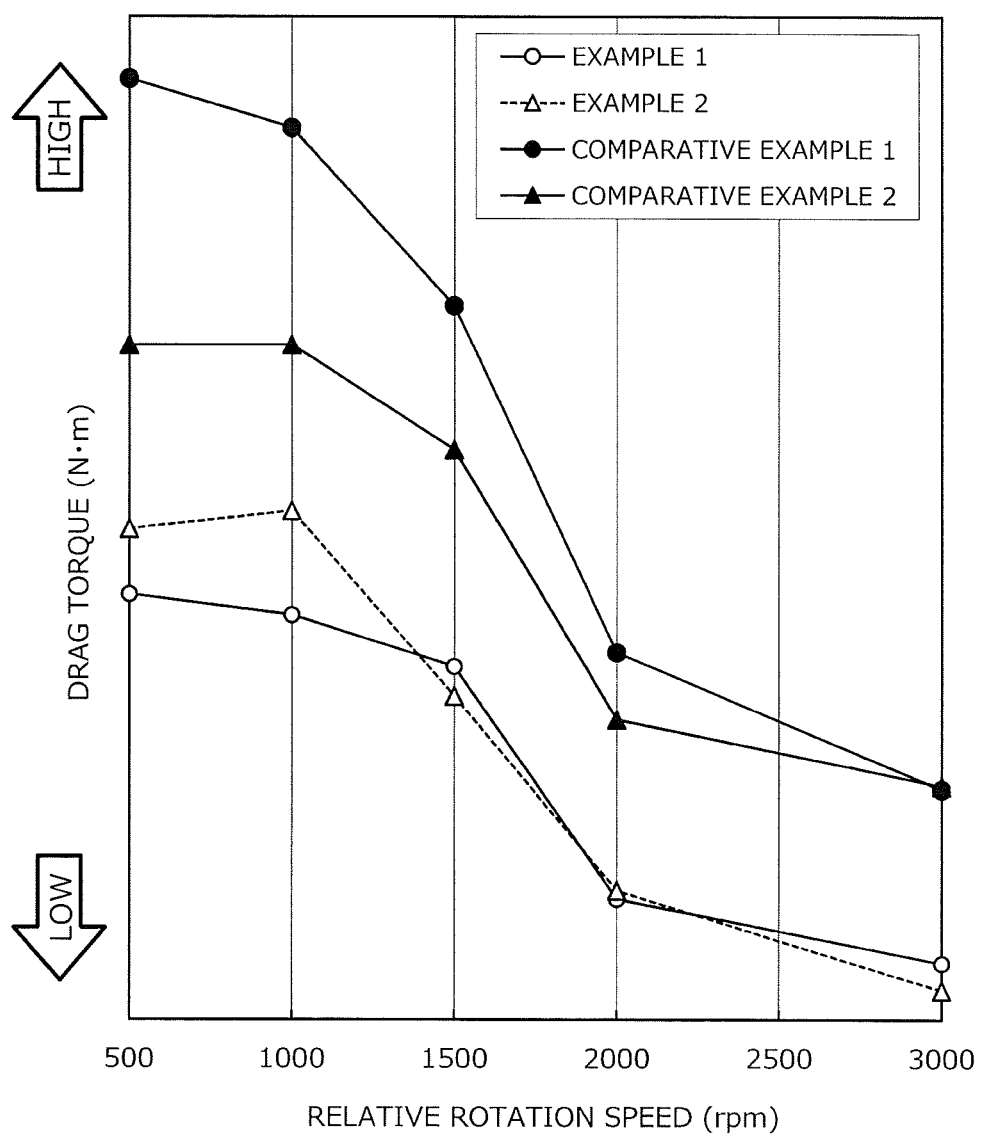

WET FRICTION MEMBER

CROSS REFERENCE

This application claims priority of Japanese Patent Application No. 2018-075753 filed on Apr. 10, 2018 and priority of Japanese Patent Application No. 2019-021066 filed on Feb. 7, 2019 under 35 U.S.C. § 119, the disclosures of which are expressly incorporated herein by reference in their entirety.

BACKGROUND OF THE INVENTION

(1) Field of the Invention

The present invention relates to a wet friction member. More particularly, the present invention relates to a wet friction member to be used in the presence of lubricating oil.

(2) Description of Related Art

Wet clutches and wet brakes using wet friction members have been conventionally used for torque transmission, braking, and the like. For example, a wet friction member is used in a wet clutch in an automatic transmission for an automobile or the like.

The wet clutch has a structure in which a plurality of wet friction members and a plurality of separator plates are alternately arranged via small clearances, and in which the wet friction members and the separator plates are pressure-contacted with/separated from each other for torque transmission/non-transmission. Lubricating oil is also supplied into the clutch, for example, to reduce the friction of the wet friction members in the pressure contact/separation and to absorb the frictional heat caused by friction. It is known that, when this clutch is not engaged, the wet friction members and the separator plates are separated from each other and relatively rotated, and that a torque called drag torque is generated at that time.

Since this drag torque consumes unnecessary energy when the clutch idly rotates, the reduction in drag torque is desired as a measure for reducing fuel consumption which has been rapidly advanced in recent years. As techniques for reducing this drag torque, the techniques described in JP 2001-295859 A, JP 2005-282648 A and JP 2016-098901 A are known.

SUMMARY OF THE INVENTION

JP 2001-295859 A discloses a wet friction member taking a form such that a wide part having a wide groove width is formed in an inner peripheral-side opening part by providing a cut part in a segment piece (FIGS. 3 and 5 of JP 2001-295859 A). It discloses that, due to this structure, lubricating oil is blocked at a point where the groove width changes, with the result that a part of the oil flows out onto a surface of the segment piece, and thus that it is possible to suppress contact of the wet friction member with a mating plate and to reduce the drag torque.

JP 2005-282648 A discloses a wet friction member in which oil grooves each having an inner peripheral opening part which spreads in a bilaterally symmetric shape and oil grooves each having an approximately uniform width are mixed, in order to reduce the drag torque. It discloses that, due to this structure, the lubricating oil supplied from the inner periphery comes into contact with a rectangularly spreading portion 34 on the rear side of rotation, thus that the lubricating oil is positively supplied to a friction surface, thereby suppressing contact between a separator plate and the friction surface, and that the excessive lubricating oil is discharged from the oil grooves 16b having an approximately uniform width (FIG. 6(c) of JP 2005-282648 A).

However, as a result of repeated extensive studies to further reduce the drag torque, the present inventors have found that the wet friction member shown in FIG. 1 of JP 2016-098901 A exhibits an excellent drag torque reduction effect, which is presented in JP 2016-098901 A. Thereafter, it has been revealed that the wet friction member shown in FIG. 1 of JP 2016-098901 A has attained a further excellent drag torque reduction as compared with the wet friction members having the structures described in JP 2001-295859 A and JP 2005-282648 A. In particular, it has been revealed that the structure described in JP 2016-098901 A has a drag torque reduction effect higher than those of the structures described in JP 2001-295859 A and JP 2005-282648 A mainly in a low rotation region. Based on these experiences, the present inventors repeatedly made extensive studies for further reducing the drag torque, and, as a result, have found the structure of a wet friction member having a drag torque reduction effect higher than those of the wet friction members described in JP 2001-295859 A, JP 2005-282648 A and JP 2016-098901 A.

The present invention has been made through the process, and it is an object thereof to provide a wet friction member which can achieve a further reduction in drag torque by virtue of a structure different from conventional ones.

The present invention is as follows.

[1] A wet friction member of the first invention includes:
a core plate formed in a flat ring shape; and
a friction part arranged on a main surface of the core plate.

The friction part is formed in such a manner that four kinds of segment pieces, which are the following pieces ($G_1$) to ($G_4$), are arranged in a ring shape via oil grooves:

($G_1$) a first piece in which a lower right corner of an approximately rectangular piece is notched in an approximately rectangular shape;

($G_2$) a second piece in which a lower left corner of an approximately rectangular piece is notched in an approximately rectangular shape;

($G_3$) a third piece in which an upper right corner of an approximately rectangular piece is notched in an approximately rectangular shape; and ($G_4$) a fourth piece in which an upper left corner of an approximately rectangular piece is notched in an approximately rectangular shape.

The segment pieces are repeatedly arranged in an arrangement order of the first piece, the second piece, the third piece, and the fourth piece.

[2] In the wet friction member,
when an oil groove defined by the second piece and the third piece which are adjacent to each other is defined as a second oil groove and
when an oil groove defined by the first piece and the fourth piece which are adjacent to each other is defined as a fourth oil groove,
the second oil groove and the fourth oil groove can be each provided with a straight channel between an inner peripheral-side opening part and an outer peripheral-side opening part, the straight channel having an approximately constant groove width and also having a flow path which runs straight toward a rotation center of the wet friction member.

[3] In the wet friction member,
when an oil groove defined by the first piece and the second piece which are adjacent to each other is defined as a first oil groove and
when an oil groove defined by the third piece and the fourth piece which are adjacent to each other is defined as a third oil groove,
the first oil groove and the third oil groove can each have a wide part having a wide groove width and a narrow part having a narrow groove width, and
the wide part can have, on one end side, an opening part leading to the inner peripheral side or outer peripheral side and have, on another end side, a connection part leading to the narrow part, and can be provided with a straight channel between the opening part and the connection part, the straight channel having a constant groove width and also having a flow path which runs straight toward a rotation center of the wet friction member.

[4] In the wet friction member, the first piece and the second piece can be line-symmetric and the third piece and the fourth piece can be line-symmetric, in a plan view.

[5] A wet friction member of the second invention includes:
a core plate formed in a flat ring shape; and
a friction part arranged in a ring shape on a main surface of the core plate.
The friction part includes:
a plurality of segment pieces including segment pieces $(G_1)$ to $(G_4)$:
  $(G_1)$ a first piece in which a lower right corner of an approximately rectangular piece is notched in an approximately rectangular shape;
  $(G_2)$ a second piece in which a lower left corner of an approximately rectangular piece is notched in an approximately rectangular shape;
  $(G_3)$ a third piece in which an upper right corner of an approximately rectangular piece is notched in an approximately rectangular shape; and
  $(G_4)$ a fourth piece in which an upper left corner of an approximately rectangular piece is notched in an approximately rectangular shape; and
the following combinations $(T_1)$ and $(T_2)$:
  $(T_1)$ a combination in which the first piece and the second piece are arranged in such a manner that a right side of the first piece and a left side of the second piece face each other via an oil groove; and
  $(T_2)$ a combination in which the third piece and the fourth piece are arranged in such a manner that a right side of the third piece and a left side of the fourth piece face each other via an oil groove.

[6] The wet friction member can include at least one of an arrangement order of the combination $(T_2)$, the combination $(T_1)$ and the combination $(T_2)$ and an arrangement order of the combination $(T_1)$, the combination $(T_2)$ and the combination $(T_1)$.

[7] A wet friction member of the third invention includes:
a core plate formed in a flat ring shape; and
a friction part arranged in a ring shape on a main surface of the core plate.
The friction part includes:
a plurality of segment pieces including segment pieces $(G_1)$ to $(G_4)$:
  $(G_1)$ a first piece in which a lower right corner of an approximately rectangular piece is notched in an approximately rectangular shape;
  $(G_2)$ a second piece in which a lower left corner of an approximately rectangular piece is notched in an approximately rectangular shape;
  $(G_3)$ a third piece in which an upper right corner of an approximately rectangular piece is notched in an approximately rectangular shape; and
  $(G_4)$ a fourth piece in which an upper left corner of an approximately rectangular piece is notched in an approximately rectangular shape; and
the following combination $(T_3)$ and/or the following combination $(T_4)$:
  $(T_3)$ a combination in which the fourth piece, the first piece, the second piece and the third piece are arranged in this arrangement order via oil grooves; and
  $(T_4)$ a combination in which the second piece, the third piece, the fourth piece and the first piece are arranged in this arrangement order via oil grooves.

[8] In the wet friction member, all of the segment pieces $(G_1)$ to $(G_4)$ can satisfy $0.10 \leq W_2/W_1 \leq 0.80$, when a maximum width thereof is $W_1$ and the maximum width of notch parts thereof is $W_2$.

[9] In the wet friction member, all of the segment pieces $(G_1)$ to $(G_4)$ can satisfy $0.25 \leq H_2/H_1 \leq 0.75$, when a maximum height thereof is $H_1$ and the maximum height of notch parts thereof is $H_2$.

[10] A wet friction member of the fourth invention includes:
a core plate formed in a flat ring shape; and
a friction part arranged in a ring shape on a main surface of the core plate.
The friction part includes a plurality of segment pieces arranged in a ring shape via an oil groove, the plurality of segment pieces including segment pieces $(G_5)$ and $(G_6)$:
  $(G_5)$ a fifth piece in which a lower right corner and an upper left corner of an approximately rectangular piece are each notched in an approximately rectangular shape; and
  $(G_6)$ a sixth piece in which an upper right corner and a lower left corner of an approximately rectangular piece are each notched in an approximately rectangular shape.

[11] In the wet friction member, the friction part can include at least one of the following combinations $(T_5)$ and $(T_6)$:
  $(T_5)$ a combination in which the fifth piece and the sixth piece are arranged in such a manner that a right side of the fifth piece and a left side of the sixth piece face each other via an oil groove; and
  $(T_6)$ a combination in which the fifth piece and the sixth piece are arranged in such a manner that a left side of the fifth piece and a right side of the sixth piece face each other via an oil groove.

[12] In the wet friction member, both of the segment pieces $(G_5)$ and $(G_6)$ can satisfy $0.05 \leq W_2/W_1 \leq 0.40$, when a maximum width thereof is $W_1$ and the maximum width of one of notch parts thereof is $W_2$.

[13] In the wet friction member, both of the segment pieces $(G_5)$ and $(G_6)$ can satisfy $0.25 \leq H_2/H_1 \leq 0.75$, when a maximum height thereof is $H_1$ and the maximum height of one of notch parts thereof is $H_2$.

The wet friction member of the first invention can achieve a further reduction in drag torque by virtue of a structure different from conventional ones.

When the wet friction member includes a second oil groove and a fourth oil groove which are each provided with a straight channel between an inner peripheral-side opening part and an outer peripheral-side opening part, the straight channel having an approximately constant groove width and also having a flow path that runs straight toward a rotation center of the wet friction member, this wet friction member can exhibit an excellent drag torque reduction effect in a region with a high relative rotation speed with a mating member such as a separator plate, as compared with a form not having this structure.

When the wet friction member includes a first oil groove which includes a wide part having a wide groove width and a narrow part having a narrow groove width and the wide part has, on one end side, an opening part leading to the inner peripheral side and has, on the other end side, a connection part leading to the narrow part, and is provided with a straight channel between the opening part and the connection part, the straight channel having a constant groove width and also having a flow path which runs straight toward a rotation center of the wet friction member, it is possible to more positively supply the lubricating oil to a friction surface of the segment piece, thereby reducing the drag torque generated between the wet friction member and a mating member such as a separator plate, as compared with a form not having this structure.

When the wet friction member includes a third oil groove which includes a wide part having a wide groove width and a narrow part having a narrow groove width and the wide part has, on one end side, an opening part leading to the outer peripheral side and has, on the other end side, a connection part leading to the narrow part, and is provided with a straight channel between the opening part and the connection part, the straight channel having a constant groove width and also having a flow path which runs straight toward a rotation center of the wet friction member, it is possible to suppress a reduction in lubricating oil discharging property due to the surface tension of the lubricating oil, thereby reducing the drag torque, as compared with a form not having this structure.

When the first piece and the second piece are line-symmetric, the third piece and the fourth piece are line-symmetric, the first piece and the fourth piece are point-symmetric, and the second piece and the third piece are point-symmetric in a plan view, it is possible to obtain the wet friction member by utilizing the segment pieces having two types of shapes. Therefore, it is possible to obtain manufacturing efficiency as compared with those of conventional wet friction members.

The wet friction member of the second invention can achieve a further reduction in drag torque by virtue of a structure different from conventional ones.

When the wet friction member includes at least one of an arrangement order of the combination ($T_2$), the combination ($T_1$) and the combination ($T_2$) and an arrangement order of the combination ($T_1$), the combination ($T_2$) and the combination ($T_1$), this wet friction member can achieve an excellent drag torque reduction, as compared with a form not having this structure.

The wet friction member of the third invention can achieve a further reduction in drag torque by virtue of a structure different from conventional ones.

When the segment pieces ($G_1$) to ($G_4$) satisfy $0.20 \leq W_2/W_1 \leq 0.75$ in the case where their maximum width is $W_1$ and the maximum width of their notch parts is $W_2$, it is possible to obtain an excellent drag torque reduction effect as compared with a form not having this structure.

When the segment pieces ($G_1$) to ($G_4$) satisfy $0.25 \leq H_2/H_1 \leq 0.75$ in the case where their maximum height is $H_1$ and the maximum height of their notch parts is $H_2$, it is possible to obtain an excellent drag torque reduction effect as compared with a form not having this structure.

The wet friction member of the fourth invention can achieve a further reduction in drag torque by virtue of a structure different from conventional ones.

When the friction part includes at least one of the following combinations ($T_5$) and ($T_6$), it is possible to obtain an excellent drag torque reduction effect as compared with a form not having this structure.

When the segment pieces ($G_5$) and ($G_6$) satisfy $0.05 \leq W_2/W_1 \leq 0.40$ in the case where their maximum width is $W_1$ and the maximum width of one of their notch parts is $W_2$, it is possible to obtain an excellent drag torque reduction effect as compared with a form not having this structure.

When the segment pieces ($G_5$) and ($G_6$) satisfy $0.25 \leq H_2/H_1 \leq 0.75$ in the case where their maximum height is $H_1$ and the maximum height of one of their notch parts is $H_2$, it is possible to obtain an excellent drag torque reduction effect as compared with a form not having this structure.

BRIEF DESCRIPTION OF THE DRAWINGS

FIG. 1A is a plan view showing an example of a wet friction member of a first invention, and FIG. 1B is a perspective view showing a part thereof in an enlarged manner;

FIGS. 2A to 2C are explanatory views for explaining the shape and variations of a first piece;

FIGS. 3A to 3C are explanatory views for explaining the shape and variations of a second piece;

FIGS. 4A to 4C are explanatory views for explaining the shape and variations of a third piece;

FIGS. 5A to 5C are explanatory views for explaining the shape and variations of a fourth piece;

FIG. 6 is an explanatory view for explaining oil grooves;

FIG. 7 is an explanatory view for explaining oil grooves;

FIG. 8 is an explanatory view for explaining the sizes of a segment piece and a notch part;

FIG. 9 is a plan view showing a part of another example of the wet friction member of the first invention in an enlarged manner;

FIG. 10 is a plan view showing an example of a wet friction member of a second invention;

FIGS. 11A and 11B are explanatory views for explaining a combination $T_1$ and a combination $T_2$, respectively;

FIGS. 12A and 12B are explanatory views for explaining an arrangement order $T_2$-$T_1$-$T_2$ and an arrangement order $T_1$-$T_2$-$T_1$, respectively;

FIG. 13 is a plan view showing an example of a wet friction member of a third invention;

FIGS. 14A and 14B are explanatory views for explaining a combination $T_3$ and a combination $T_4$, respectively;

FIG. 15 is a plan view showing an example of a wet friction member of a fourth invention;

FIGS. 16A and 16B are explanatory views for explaining a combination $T_5$ and a combination $T_6$, respectively;

FIG. 17 is an explanatory view for explaining the sizes of a segment piece and notch parts;

FIGS. 18A to 18C are explanatory views for explaining the shape and variations of a fifth piece;

FIGS. 19A to 19C are explanatory views for explaining the shape and variations of a sixth piece;

FIGS. 20A to 20C are explanatory views for explaining the shape and variations of a seventh piece;

FIGS. 21A to 21C are explanatory views for explaining the shape and variations of an eighth piece;

FIG. 22 is a partial plan view showing an example of a wet friction member of a comparative example;

FIG. 23 is a partial plan view showing another example of the wet friction member of the comparative example; and FIG. 24 is a graph showing the correlation between the drag torque of each of the wet friction members and the relative rotation speed.

DETAILED DESCRIPTION OF PREFERRED EMBODIMENTS

Hereinafter, the present invention will be described with reference to the drawings. The particulars described herein are given by way of example and for the purpose of illustrative discussion of the embodiments of the present invention, and are presented for the purpose of providing what is believed to be the description from which the principles and conceptual features of the present invention can be most effectively and readily understood. In this point, the embodiments are necessary for fundamental comprehension of the present invention and how some embodiments of the present invention are embodied in practice is clearly shown to those skilled in the art by an explanation in connection with drawings without intending to indicate a structural detail of the present invention above a certain level.

A segment piece 4 will be explained below in the present description on the assumption that the segment piece 4 is placed at the 12 o'clock position on a clock dial. Therefore, for the predetermined segment piece 4, the term "right" means a direction from the 9 o'clock position to the 3 o'clock position on the clock dial, and the term "left" means a direction from the 3 o'clock position to the 9 o'clock position thereon. Further, the term "upper" means a direction from the 6 o'clock position to the 12 o'clock position on a clock dial, and the term "lower" means a direction from the 12 o'clock position to the 6 o'clock position thereon.

1. Wet friction member of first invention

A wet friction member 1 of a first invention includes a core plate 2 formed in a flat ring shape and a friction part 3 arranged on a main surface 2a of the core plate 2.

Between them, the friction part 3 has four kinds of segment pieces 4 of $G_1$ to $G_4$ arranged in a ring shape via oil grooves 5 (see FIGS. 1A and 1B).

($G_1$) a first piece in which the lower right corner of an approximately rectangular piece is notched in an approximately rectangular shape ($G_2$) a second piece in which the lower left corner of an approximately rectangular piece is notched in an approximately rectangular shape ($G_3$) a third piece in which the upper right corner of an approximately rectangular piece is notched in an approximately rectangular shape ($G_4$) a fourth piece in which the upper left corner of an approximately rectangular piece is notched in an approximately rectangular shape Further, the segment pieces 4 are repeatedly arranged in an arrangement order of the first piece $G_1$, the second piece $G_2$, the third piece $G_3$ and the fourth piece $G_4$.

1-1. Core Plate

The core plate 2 has a flat ring shape. In other words, it has an annular shape in which the center of a plate body is opened. The core plate 2 has the center of the ring shape as rotation center P. The main surface 2a of the core plate 2 is a surface to which the segment pieces 4 are joined to form the friction part 3. The main surface 2a may be provided only on one surface of the core plate 2 or on both surfaces thereof. That is, the friction part 3 may be formed only on one surface of the core plate 2 or may be formed on both surfaces thereof.

In addition to the main surface 2a, the core plate 2 may have other necessary structures as appropriate. As such other structures, engagement teeth and the like can be indicated. The engagement teeth can be provided protruding from the inner or outer peripheral surface of the core plate 2. Specifically, the core plate 2 can have engagement teeth 8 protruding from the inner peripheral surface 21, as shown in FIGS. 1A and 1B. The engagement teeth 8 are arranged so as to be engageable with splines arranged on the outer periphery of a hub serving as a rotation axis with respect to the wet friction member 1.

The size or the like of the core plate 2 is not limited, nor is the correlation between the outer diameter and the inner diameter limited. For example, when the outer diameter is $R_1$ (diameter of the outer periphery) and the inner diameter is $R_2$ (if the core plate 2 has the engagement teeth 8, the inner peripheral surface 21 except the engagement teeth 8 is defined as a reference), the ratio $R_1/R_2$ can be set to $1 \leq R_1/R_2 \leq 10$, to $1.05 \leq R_1/R_2 \leq 5$, and to $1.1 \leq R_1/R_2 \leq 3$.

Further, when the thickness of the core plate 2 is D (mm), the thickness D is not limited, but can be set, for example, to $0.1 \leq D$ (mm)$\leq 10$ mm, to $0.3 \leq D$ (mm)$\leq 7$, and to $0.5 \leq D$ (mm)$\leq 5$.

Furthermore, the core plate 2 may be made of any material, and various types of carbon steel (S35C, S55C, etc.), cold rolled steel sheets (SPCC, SPCCT, etc.), and low carbon high tensile strength steel (NCH780 etc.) can be used as the material therefor.

1-2. Friction Part

The friction part 3 is formed of the segment pieces 4 and the oil grooves 5. Specifically, the plurality of segment pieces 4 are formed to be arranged in a ring shape via the oil grooves 5.

The friction part 3 has the function of adjusting the degree of interlocking between the wet friction member 1 and a mating member (for example, separator plate) adjacent thereto depending on the degree of contact therebetween. That is, it has a brake function (braking function) and a torque transmission function with respect to the mating member.

The friction part 3 may take either the same form or different forms on the front main surface 2a and the back main surface 2a of the core plate 2.

1-3. Segment Piece

The segment pieces 4 constitute the friction part 3 as described above, and their surfaces serve as friction surfaces. Since the oil grooves 5 are formed to be defined by the segment pieces 4, the shapes of the oil grooves 5 are also determined by the outer shapes of the segment pieces 4 and the arrangement thereof.

The segment pieces 4 used in the wet friction member 1 include at least four kinds, i.e., a first piece $G_1$, a second piece $G_2$, a third piece $G_3$ and a fourth piece $G_4$.

The first piece $G_1$ is a segment piece in which the lower right corner of an approximately rectangular piece is notched in an approximately rectangular shape (see FIGS. 2A to 2C). That is, the first piece $G_1$ is a segment piece formed in a shape having an approximately rectangular notch part 41L at the lower right of an approximately rectangular piece.

As shown in FIG. 2A, the first piece $G_1$ can be formed only from straight lines. In this case, the first piece $G_1$ can include six sides, i.e., sides 411 to 416.

Further, as shown in FIG. 2B, in the first piece $G_1$, the sides 411, 413 and 415 can be formed by curved lines. Specifically, the sides can be formed by curved lines bulging toward the outer peripheral side $S_O$ so as to have a curvature according to the distance from the rotation center P. Further, in order that the oil grooves 5 have an approximately constant groove width, the sides 412 and 416 can be formed by straight lines inclined so that the rotation center P is positioned on the extension line thereof. Further, as shown in FIG. 2C, each corner part of the first piece $G_1$ can be chamfered into a curved shape.

The size of the notch part 41L in the first piece $G_1$ is not limited, but when the maximum width of the first piece $G_1$ is $W_1$ and the maximum width of the notch part 41L of the first piece is $W_2$ (see FIG. 8), the first piece $G_1$ can satisfy $0.10 \leq W_2/W_1 \leq 0.80$. In this range, an excellent drag torque reduction effect can be obtained. The $W_2/W_1$ can be further set to $0.15 \leq W_2/W_1 \leq 0.70$, further to $0.18 \leq W_2/W_1 \leq 0.65$, further to $0.20 \leq W_2/W_1 \leq 0.60$, further to $0.23 \leq W_2/W_1 \leq 0.40$, and further to $0.25 \leq W_2/W_1 \leq 0.40$. In each of these ranges, a better drag torque reduction effect can be obtained.

Further, when the maximum height of the first piece $G_1$ is $H_1$ and the maximum height of the notch part 41L of the first piece is $H_2$ (see FIG. 8), the first piece $G_1$ can satisfy $0.25 \leq H_2/H_1 \leq 0.75$. In this range, an excellent drag torque reduction effect can be obtained. The $H_2/H_1$ can be further set to $0.10 \leq H_2/H_1 \leq 0.80$, further to $0.15 \leq H_2/H_1 \leq 0.70$, further to $0.20 \leq H_2/H_1 \leq 0.65$, further to $0.22 \leq H_2/H_1 \leq 0.60$, further to $0.24 \leq H_2/H_1 \leq 0.50$, and further to $0.25 \leq H_2/H_1 \leq 0.40$. In each of these ranges, a better drag torque reduction effect can be obtained.

The second piece $G_2$ is a segment piece in which the lower left corner of an approximately rectangular piece is notched in an approximately rectangular shape (see FIGS. 3A to 3C). That is, it is a segment piece formed in a shape having an approximately rectangular notch part 42L at the lower left of an approximately rectangular piece.

As in the case of the first piece $G_1$, this second piece $G_2$ can be formed only from straight lines, as shown in FIG. 3A. In this case, the second piece $G_2$ can include six sides, i.e., sides 421 to 426.

Further, as shown in FIG. 3B, in the second piece $G_2$, the sides 421, 423 and 425 can be formed by curved lines. Specifically, the sides can be formed by curved lines bulging toward the outer peripheral side $S_O$ so as to have a curvature according to the distance from the rotation center P. Further, in order that the oil grooves 5 have an approximately constant groove width, the sides 422 and 426 can be formed by straight lines inclined so that the rotation center P is positioned on the extension line thereof. Further, as shown in FIG. 3C, each corner part of the second piece $G_2$ can be chamfered into a curved shape.

Further, the size of the notch part 42L in the second piece $G_2$ is not limited, and the descriptions regarding the ratios $W_2/W_1$ and $H_2/H_1$ of the first piece $G_1$ can be directly applied to the second piece $G_2$.

These first piece $G_1$ and second piece $G_2$ may be asymmetric to each other, but are preferably line-symmetric, in a plan view. That is, more specifically, it is preferable that the first piece $G_1$ and the second piece $G_2$ be mirror-symmetric to each other.

When the first piece $G_1$ and the second piece $G_2$ are line-symmetric in a plan view, the shape of the oil groove 51 formed to be defined by the first piece $G_1$ and the second piece $G_2$ is bilaterally symmetric, so that stable performance with respect to the lubricating oil can be obtained regardless of the rotating direction.

In addition, since the first piece $G_1$ can be used as the second piece $G_2$ by reversing the first piece $G_1$, the first piece $G_1$ and the second piece $G_2$ can be manufactured simultaneously by single punching. Therefore, the segment pieces 4 are easily manufactured, which is a great cost merit.

The third piece $G_3$ is a segment piece in which the upper right corner of an approximately rectangular piece is notched in an approximately rectangular shape (see FIGS. 4A to 4C). That is, the third piece $G_3$ is a segment piece formed in a shape having an approximately rectangular notch part 43L at the upper right of an approximately rectangular piece.

As shown in FIG. 4A, the third piece $G_3$ can be formed only from straight lines. In this case, the third piece $G_3$ can include six sides, i.e., sides 431 to 436.

Further, as shown in FIG. 4B, in the third piece $G_3$, the sides 431, 433 and 435 can be formed by curved lines. Specifically, the sides can be formed by curved lines bulging toward the outer peripheral side $S_O$ so as to have a curvature according to the distance from the rotation center P. Further, in order that the oil grooves 5 have an approximately constant groove width, the sides 432 and 434 can be formed by straight lines inclined so that the rotation center P is positioned on the extension line thereof. Furthermore, as shown in FIG. 4C, each corner of the third piece $G_3$ can be chamfered into a curved shape.

Further, the size of the notch part 43L in the third piece $G_3$ is not limited, and the descriptions regarding the ratios $W_2/W_1$ and $H_2/H_1$ of the first piece $G_1$ can be directly applied to the third piece $G_3$.

The fourth piece $G_4$ is a segment piece in which the upper left corner of an approximately rectangular piece is notched in an approximately rectangular shape (see FIGS. 5A to 5C). That is, it is a segment piece formed in a shape having an approximately rectangular notch part 44L at the upper left of an approximately rectangular piece.

As in the case of the third piece $G_3$, this fourth piece $G_4$ can be formed only from straight lines, as shown in FIG. 5A. In this case, the fourth piece $G_4$ can include six sides, i.e., sides 441 to 446.

Further, as shown in FIG. 5B, in the fourth piece $G_4$, the sides 441, 443 and 445 can be formed by curved lines. Specifically, the sides can be formed by curved lines bulging toward the outer peripheral side $S_O$ so as to have a curvature according to the distance from the rotation center P. Further, in order that the oil grooves 5 have an approximately constant groove width, the sides 442 and 446 can be formed by straight lines inclined so that the rotation center P is positioned on the extension line thereof. Further, as shown in FIG. 5C, each corner part of the fourth piece $G_4$ can be chamfered into a curved shape.

Further, the descriptions regarding the ratios $W_2/W_1$ and $H_2/H_1$ of the first piece $G_1$ can be directly applied to the fourth piece $G_4$.

The third piece $G_3$ and the fourth piece $G_4$ may be asymmetric to each other but are preferably line-symmetric, in a plan view. That is, more specifically, it is preferable that the third piece $G_3$ and the fourth piece $G_4$ be mirror-symmetric to each other.

When the third piece $G_3$ and the fourth piece $G_4$ are line-symmetric in a plan view, the shape of the oil groove 53 formed to be defined by the third piece $G_3$ and the fourth piece $G_4$ is bilaterally symmetric, so that stable performance with respect to the lubricating oil can be obtained regardless of the rotating direction.

In addition, since the third piece $G_3$ can be used as the fourth piece $G_4$ by reversing the third piece $G_3$, the third piece $G_3$ and the fourth piece $G_4$ can be manufactured simultaneously by single punching. Therefore, the segment pieces 4 are easily manufactured, which is a great cost merit.

It is preferable that the maximum widths $W_1$ and the maximum heights $H_1$ of these segment pieces 4 be the same among the four kinds of segment pieces from the first piece $G_1$ to the fourth piece $G_4$. Further, it is preferable that the maximum widths $W_2$ and the maximum heights $H_2$ of the notch parts in these segment pieces 4 be the same among the four kinds of segment pieces from the first piece $G_1$ to the fourth piece $G_4$.

In addition, these segment pieces 4 are repeatedly arranged in an arrangement order of the first piece $G_1$, the second piece $G_2$, the third piece $G_3$ and the fourth piece $G_4$ as one group, as described above. Other segment pieces not included in the pieces from the first piece $G_1$ to the fourth piece $G_4$ can be interposed between the respective segment pieces 4. Normally, however, it is preferable not to interpose any other segment piece between the first piece $G_1$ and the second piece $G_2$. Furthermore, it is preferable not to interpose any other segment piece between the third piece $G_3$ and the fourth piece $G_4$.

It is preferable not to interpose any other segment piece between the first piece $G_1$ and the fourth piece $G_4$, but, for example, a ninth piece $G_9$, which is a segment piece 4 formed in an approximately rectangular shape without any notch part, can be interposed. Briefly, the ninth piece $G_9$ is a segment piece 4 which is not notched at any corner and has a substantially rectangular shape as a whole. Each of the four corners may be curvedly chamfered as necessary (see FIG. 9).

When the ninth piece $G_9$ is interposed, it is preferable that the maximum width $W_1$ of the ninth piece $G_9$ be smaller than the maximum width $W_1$ of the first piece $G_1$ and the maximum width $W_1$ of the fourth piece $G_4$. For example, the maximum width $W_1$ of the first piece $G_1$ and the maximum width $W_1$ of the fourth piece $G_4$ can be made equal to each other. In the case where this maximum width is $W_{11}$ and the maximum width $W_1$ of the ninth piece $G_9$ is $W_{12}$, the $W_{12}/W_{11}$ can be set to $0.1 \leq W_{12}/W_{11} \leq 1$, to $0.2 \leq W_{12}/W_{11} \leq 0.8$, and to $0.3 \leq W_{12}/W_{11} \leq 0.7$.

When the ninth piece $G_9$ is interposed between the first piece $G_1$ and the fourth piece $G_4$, it is possible to interpose the ninth piece $G_9$, at the same time, between the second piece $G_2$ and the third piece $G_3$, as will be described below, but it is also possible not to interpose the ninth piece $G_9$ therebetween.

Similarly, it is preferable not to interpose any other segment piece between the second piece $G_2$ and the third piece $G_3$. However, for example, the ninth piece $G_9$, which is a segment piece 4 formed in an approximately rectangular shape without any notch part, can be interposed. Briefly, the ninth piece $G_9$ is a segment piece 4 which is not notched at any corner and has a substantially rectangular shape as a whole. Each of the four corners may be curvedly chamfered as necessary (see FIG. 9).

When ninth piece $G_9$ is interposed, the maximum width $W_1$ of the ninth piece $G_9$ is preferably smaller than the maximum width $W_1$ of the second piece $G_2$ and the maximum width $W_1$ of the third piece $G_3$. For example, the maximum width $W_1$ of the second piece $G_2$ and the maximum width $W_1$ of the third piece $G_3$ can be made equal to each other. In the case where this maximum width is $W_{11}$ and the maximum width $W_1$ of the ninth piece $G_9$ is $W_{12}$, $W_{12}/W_{11}$ can be set to $0.1 \leq W_{12}/W_{11} \leq 1$, to $0.2 \leq W_{12}/W_{11} \leq 0.8$ can be satisfied, and to $0.3 \leq W_{12}/W_{11} \leq 0.7$.

When the ninth piece $G_9$ is interposed between the second piece $G_2$ and the third piece $G_3$, it is possible to interpose the ninth piece $G_9$, at the same time, between the first piece $G_1$ and the fourth piece $G_4$, but it is also possible not to interpose the ninth piece $G_9$ therebetween.

In the wet friction member 1, the number of the segment pieces 4 arranged on one main surface 2a of the core plate 2 is not limited, but can be, for example, 10 or more and 100 or less. This number is preferably 15 or more and 90 or less, more preferably 20 or more and 80 or less, particularly preferably 25 or more and 60 or less.

The structure of these segment pieces 4 is not limited, and for example, a structure obtained by hardening a paper body containing a base fiber and a filler with a curable resin can be used.

Between these, various synthetic fibers, regenerated fibers, inorganic fibers, natural fibers, etc. can be used as the base fiber. Specifically, cellulose fibers (pulp), acrylic fibers, aramid fibers and the like are preferably used. Further, as the filler, cashew dust as a friction modifier, graphite and/or molybdenum disulfide as a solid lubricant, diatomaceous earth as an extender pigment, and the like can be used. These may be used alone, or a combination of two or more thereof may be used. Further, as a heat-curable resin, a phenol resin and/or a modified resin thereof can be used.

The segment pieces 4 are normally joined and fixed to the main surface 2a of the core plate 2. The method of joining the segment pieces 4 to the core plate 2 is not limited, and heat fusion, sticking (adhesion) via an adhesive or the like, and other methods can be used.

1-4. Oil Groove

The oil groove 5 is a groove serving as a flow path of the lubricating oil, which is formed as a gap between the two segment pieces 4 arranged so as to be separated from each other. The segment pieces 4 from the first piece $G_1$ to the fourth piece $G_4$ are arranged in the wet friction member 1 so as to be separated from each other, so that an oil groove 5 is formed in each of gaps between the respective segment pieces 4. Therefore, in the wet friction member 1, the oil grooves 5 are through grooves penetrating it to the inner peripheral side $S_I$ and the outer peripheral side $S_O$.

The oil groove 5 can function as a guide for discharging the lubricating oil supplied from the inner peripheral side $S_I$ of the wet friction member 1 toward the outer peripheral side $S_O$. The number of the oil grooves 5 arranged on the main surface 2a is two or more according to the number of the segment pieces 4. Normally, since all the segment pieces 4 are arranged so as to be separated from each other, the same number of the oil grooves 5 as the segment pieces 4 are formed.

In the wet friction member 1, the oil groove defined by the adjacent first piece $G_1$ and second piece $G_2$ is defined as a first oil groove 51. In addition, the oil groove defined by the adjacent second piece $G_2$ and third piece $G_3$ is defined as a second oil groove 52. Further, the oil groove defined by the adjacent third piece $G_3$ and fourth piece $G_4$ is defined as a third oil groove 53. The oil groove defined by the adjacent first piece $G_1$ and fourth piece $G_4$ is defined as a fourth oil groove 54.

In each of the oil grooves, the shape of the flow path of the oil groove is determined by the shape of the outer peripheral wall (outer wall) of each of the segment pieces 4 positioned on both sides of the oil groove. In the wet friction member 1, since the segment pieces from the first piece $G_1$ to the fourth piece $G_4$ having the notch parts 41L to 44L, respectively, are arranged in a predetermined manner, the oil groove 51 which is largely opened to the inner peripheral side and the oil groove 53 which is largely opened to the outer peripheral side are arranged correspondingly.

Specifically, the first oil groove 51 has, on the inner peripheral side $S_I$, a wide part 51w with a wide groove width formed by the notch part 41L of the first piece $G_1$ and the notch part 42L of the second piece $G_2$. On the other hand, on the outer peripheral side $S_O$, it has a narrow part 51n having a narrow groove width (see FIGS. 2A to 3C and FIGS. 6 to 7).

Similarly, the third oil groove 53 has, on the inner peripheral side $S_I$, a wide part 53w with a wide groove width formed by the notch part 43L of the third piece $G_3$ and the notch part 44L of the fourth piece $G_4$. On the other hand, on the outer peripheral side $S_O$, it has a narrow part 53n having a narrow groove width (see FIGS. 4A to 7).

Thus, the wet friction member 1 is considered to provide a high drag torque reduction effect since the first oil groove 51 and the third oil groove 53 are present correspondingly. The mechanism is not clear, but can be considered as follows.

That is, when the wet friction member 1 rotates counter-clockwise, the lubricating oil blocked by the notch part 42L of the second piece $G_2$ runs on the surface of the second piece $G_2$. Then, it is considered that the lubricating oil is interposed between the wet friction member 1 and the mating member to peel them off from each other, so that the drag torque can be reduced (see FIGS. 3A to 3C, 6, and 7).

However, it can be considered that, if the lubricating oil having run on the surface of the second piece $G_2$ is not discharged at an early stage, the lubricating oil would stay on the surface of the segment piece, i.e., the lubricating oil would be dragged, so that the drag torque caused by the drag of the lubricating oil is generated, and thus that this peeling effect would not be able to be fully utilized.

Therefore, in the wet friction member 1, the oil groove 53 having an excellent lubricating oil discharging property is provided corresponding to the oil groove 51. It is considered that this makes it possible to prevent the lubricating oil drag and to effectively utilize the peeling action described above.

Similarly, when the wet friction member 1 rotates clock-wise, the lubricating oil blocked by the notch part 41L of the first piece $G_1$ runs on the surface of the fourth piece $G_4$. Then, it is considered that the lubricating oil is interposed between the wet friction member 1 and the mating member to peel them off from each other, so that the drag torque can be reduced (see FIGS. 2A to 2C, 6, and 7).

However, it can be considered that, if the lubricating oil having run on the surface of the fourth piece $G_4$ is not discharged at an early stage, the lubricating oil would stay on the surface of the segment piece, i.e., the lubricating oil would be dragged, so that the drag torque caused by the drag of the lubricating oil is generated, and thus that this peeling effect would not be able to be fully utilized.

Therefore, in the wet friction member 1, the oil groove 53 having an excellent lubricating oil discharging property is provided corresponding to the oil groove 51. It is considered that this makes it possible to prevent the lubricating oil drag and to effectively utilize the peeling action described above.

The size of each of the oil grooves 5 is not limited, and can be set to an appropriate size according to the size of the notch part provided in the core plate 2, the number of the segment pieces 4, and the like.

For example, when an opening part leading to the outer peripheral side $S_O$ of the narrow part 51n is $E51_O$ and an opening part leading to the inner peripheral side $S_I$ of the wide part 51w is $E51_I$ (see FIG. 7), the opening part $E51_I$ is preferably 1.2 times or more and 10 times or less, more preferably 1.4 times or more and 9 times or less, particularly preferably 1.5 times or more and 8 times or less larger than the opening part $E51_O$.

More specifically, the opening width of the opening part $E51_I$ can be set to 1.5 mm or more and 20 mm or less, further to 1.5 mm or more and 15 mm or less, and further to 2 mm or more and 12 nm or less.

Similarly, when an opening part leading to the inner peripheral side $S_I$ of the narrow part 53n is $E53_I$ and an opening part leading to the outer peripheral side $S_O$ of the wide part 53w is $E53_O$ (see FIG. 7), the opening part $E53_O$ is preferably 1.2 time or more and 10 times or less, more preferably 1.4 times or more and 9 times or less, particularly preferably 1.5 times or more and 8 times or less larger than the opening part $E53_I$.

More specifically, the opening width of the opening part $E53_O$ can be set to 1.5 mm or more and 20 mm or less, further to 1.5 mm or more and 15 mm or less, and further to 2 mm or more and 12 mm or less.

Further, when the end part (the other end side), opposite to the opening part $E51_I$, of the wide part 51w of the oil groove 51 is a connection part 51c leading to the narrow part 51n, the oil groove 51 is preferably provided with a straight channel 51s between the opening part $E51_I$ and the connection part 51c, the straight channel 51s having a constant groove width and also having a flow path which runs straight toward the rotation center P of the wet friction member 1 (see FIG. 7).

Similarly, when the end part (the other end side), opposite to the opening part $E53_O$, of the wide part 53w of the oil groove 53 is a connection part 53c leading to the narrow part 53n, the oil groove 53 is preferably provided with a straight channel 53s between the opening part $E53_O$ and the connection part 53c, the straight channel 53s having a constant groove width and also having a flow path which runs straight toward the rotation center P of the wet friction member 1 (see FIG. 7).

In the case where the straight channels 51s and 53s are provided in this manner, the drag torque can be reduced more effectively. The mechanism is not clear, but it can be considered that, when the oil groove 51 has the straight channel 51s, the lubricating oil can be caused to efficiently run on the surface of the first piece $G_1$ and the surface of the second piece $G_2$, so the drag torque is easily reduced. On the other hand, it can be considered that, when the oil groove 53 has the straight channel 53s, the lubricating oil can be more efficiently discharged to the outer peripheral side $S_O$, so that the drag torque is easily reduced.

Furthermore, in addition to the oil groove 51 and the oil groove 53, the wet friction member 1 is provided with the oil groove 52 and the oil groove 54 which are provided between these oil grooves. It is considered that this improves the lubricating oil discharging property at the time of high rotation. The flow paths of the oil groove 52 and the oil groove 54 may be formed in any shape, and the oil grooves can be each provided with a flow path bent toward the rotation center P. However, the second oil groove 52 and the fourth oil groove 54 are each preferably provided with a straight channel having a flow path which runs straight toward the rotation center P.

More specifically, the second oil grooves 52 are each preferably provided with a straight channel 52s between each of the opening parts $E52_I$ on the inner peripheral side $S_I$ and each of the opening parts $E52_O$ on the outer peripheral side $S_O$, the straight channel 52s having an approximately constant groove width and also having a flow path which runs straight toward the rotation center P of the wet friction member 1.

Further, the fourth oil grooves 54 are each preferably provided with a straight channel 54s between each of the opening parts E54$_I$ on the inner peripheral side S$_I$ and each of the opening parts E54$_O$ on the outer peripheral side S$_O$, the straight channel 54s having an approximately constant groove width and also having a flow path which runs straight toward the rotation center P of the wet friction member 1.

By virtue of the straight channel 52s and the straight channel 54s, the drag torque can be reduced. Especially, the effect against drag torque reduction at the time of high rotation can be exerted. The mechanism is not clear, but can be considered as follows.

Specifically, as described above, it is considered that, when the wet friction member 1 rotates counterclockwise, the lubricating oil blocked by the notch part 42L of the second piece G$_2$ runs on the surface of the second piece G$_2$, thereby reducing the drag torque (see FIGS. 3A to 3C, 6, and 7).

It is considered that, since the wet friction member 1 is provided with the oil groove 53 corresponding to the oil groove 51, it is possible to prevent the lubricating oil drag and to effectively utilize the peeling effect. However, it is further considered that a particularly high lubricating oil discharging property would be required at the time of high rotation. Therefore, it is considered that, by virtue of the oil groove 52, the lubricating oil can be discharged before reaching the oil groove 53, thereby making it possible to enhance the discharge property at the time of high rotation without reducing the friction area. Accordingly, it is preferable that the oil groove 52 be configured so that the lubricating oil can be discharged more smoothly without staying, and it is considered preferable that the oil groove 52 have the straight channel 52s as the flow path, as described above.

Similarly, it is considered that, when the wet friction member 1 rotates clockwise, the lubricating oil blocked by the notch part 41L of the first piece G$_1$ runs on the surface of the fourth piece G$_4$, thereby reducing the drag torque (See FIGS. 2A to 2C, 6, and 7).

It is considered that, since the wet friction member 1 is provided with the oil groove 53 corresponding to the oil groove 51, it is possible to prevent the lubricating oil drag and to effectively utilize the peeling effect. However, it is further considered that a particularly high lubricating oil discharging property would be required at the time of high rotation. Therefore, it is considered that, by virtue of the oil groove 54, the lubricating oil can be discharged before reaching the oil groove 53, thereby making it possible to enhance the discharge property at the time of high rotation without reducing the friction area. Accordingly, it is preferable that the oil groove 54 be configured so that the lubricating oil can be discharged more smoothly without staying, and it is considered preferable that the oil groove 54 have the straight channel 54s as the flow path, as described above.

Further, as described above, also when the ninth piece G$_9$ is interposed between the first piece G$_1$ and the fourth piece G$_4$ or between the second piece G$_2$ and the third piece G$_3$ (see FIG. 9), each of the oil grooves preferably has a straight channel for the reasons described above.

That is, when the ninth piece G$_9$ is interposed between the first piece G$_1$ and the fourth piece G$_4$, there are two oil grooves 5 between the first piece G$_1$ and the fourth piece G$_4$. In this case, the oil groove on the side of the fourth piece G$_4$ is defined as a fourth-a oil groove 541, and the oil groove on the side of the first piece G$_1$ is defined as a fourth-b oil groove 542 (see FIG. 9).

Likewise, when the ninth piece G$_9$ is interposed between the second piece G$_2$ and the third piece G$_3$, there are two oil grooves 5 between the second piece G$_2$ and the third piece G$_3$. In this case, the oil groove on the side of the second piece G$_2$ is defined as a second-a oil groove 521, and the oil groove on the side of the third piece G$_3$ is defined as a second-b oil groove 522 (see FIG. 9).

In this case, the oil grooves 541, 542, 521 and 522 preferably have straight channels 541s, 542s, 521s and 522s, respectively. Thus, it is possible to more effectively obtain the drag torque reduction action at the time of high rotation.

2. Wet friction member of second invention

A wet friction member 1 of a second invention includes a core plate 2 formed in a flat ring shape and a friction part 3 arranged in a ring shape on a main surface 2a of the core plate 2.

Between these, the friction part 3 includes a plurality of segment pieces 4 including four kinds of segment pieces of G$_1$ to G$_4$ and includes a combination of T$_1$ and T$_2$ (see FIGS. 10 to 11B).

(G$_1$) a first piece in which the lower right corner of an approximately rectangular piece is notched in an approximately rectangular shape (G$_2$) a second piece in which the lower left corner of an approximately rectangular piece is notched in an approximately rectangular shape (G$_3$) a third piece in which the upper right corner of an approximately rectangular piece is notched in an approximately rectangular shape (G$_4$) a fourth piece in which the upper left corner of an approximately rectangular piece is notched in an approximately rectangular shape (T$_1$) a combination in which the first piece G$_1$ and the second piece G$_2$ are arranged in such a manner that the right side of the first piece G$_1$ and the left side of the second piece G$_2$ face each other via an oil groove 5

(T$_2$) a combination in which the third piece G$_3$ and the fourth piece G$_4$ are arranged in such a manner that the right side of the third piece G$_3$ and the left side of the fourth piece G$_4$ face each other via an oil groove 1-1. Core Plate As the core plate 2, the core plate 2 used in the wet friction member 1 of the first invention described above can be applied as it is.

1-2. Friction Part

The friction part 3 is formed of the segment pieces 4 and the oil grooves 5, similarly to the friction part 3 of the wet friction member 1 according to the first invention described above. Specifically, the plurality of segment pieces 4 are formed to be arranged in a ring shape via the oil grooves 5.

Also, the friction part 3 has the function of adjusting the degree of interlocking between the wet friction member 1 and a mating member (for example, separator plate) adjacent thereto depending on the degree of contact therebetween. That is, it similarly has a brake function (braking function) and a torque transmission function with respect to the mating member.

Further, similarly, the friction part 3 may take either the same form or different forms on the front main surface 2a and the back main surface 2a of the core plate 2.

1-3. Segment Piece

The segment pieces 4 constitute the friction part 3 as described above, and their surfaces serve as friction surfaces. Since the oil grooves 5 are formed to be defined by the segment pieces 4, the shapes of the oil grooves 5 are also determined by the outer shapes of the segment pieces 4 and the arrangement thereof.

The segment pieces 4 used in the wet friction member 1 of the second invention include a plurality of segment pieces 4 including at least four kinds of segment pieces which are a first piece $G_1$, a second piece $G_2$, a third piece $G_3$ and a fourth piece $G_4$.

As the first piece $G_1$, the second piece $G_2$, the third piece $G_3$ and the fourth piece $G_4$ used in the wet friction member 1 of the second invention, the first piece $G_1$, the second piece $G_2$, the third piece $G_3$ and the fourth piece $G_4$ explained for the wet friction member 1 of the first invention can be applied as they are.

Similarly, the first piece $G_1$ and the second piece $G_2$ may be asymmetric to each other but are preferably line-symmetric, in a plan view.

Further, similarly, the third piece $G_3$ and the fourth piece $G_4$ may be asymmetric to each other but are preferably line-symmetric, in a plan view.

Similarly, it is preferable that the maximum widths $W_1$ and the maximum heights $H_1$ of the segment pieces 4 be the same among the four kinds of segment pieces from the first piece $G_1$ to the fourth piece $G_4$, and, furthermore, that the maximum widths $W_2$ and the maximum heights $H_2$ of the notch parts in these segment pieces 4 be the same among the four kinds of segment pieces from the first piece $G_1$ to the fourth piece $G_4$.

The friction part 3 of the wet friction member 1 of the second invention includes both of a combination $T_1$ and a combination $T_2$ each of which includes predetermined segment pieces 4 (see FIGS. 11A and 11B).

Between these combinations, the combination $T_1$ (see FIG. 11A) is a combination in which the first piece $G_1$ and the second piece $G_2$ are arranged in such a manner that the right side of the first piece $G_1$ and the left side of the second piece $G_2$ face each other via an oil groove 5. A first oil groove 51 is formed by this combination T1 (see FIG. 11A). The first oil groove 51 has a wide part 51w having a wide groove width, which is formed by the notch part 41L (see FIGS. 2A to 2C) of the first piece $G_1$ and the notch part 42L (see FIGS. 3A to 3C) of the second piece $G_2$, on the inner peripheral side $S_1$ and a narrow part 51n having a narrow groove width on the outer peripheral side $S_O$. By virtue of the first oil groove 51, when the wet friction member 1 rotates counterclockwise, the lubricating oil blocked by the notch part 42L can be caused to run on the surface of the second piece $G_2$. Further, when it rotates clockwise, the lubricating oil blocked by the notch part 41L can be caused to run on the surface of the first piece $G_1$. Therefore, the lubricating oil is interposed between the wet friction member 1 and the mating member to peel them off from each other, so that the drag torque can be reduced.

On the other hand, the combination $T_2$ (see FIG. 11B) is a combination in which the third piece $G_3$ and the fourth piece $G_4$ are arranged in such a manner that the right side of the third piece $G_3$ and the left side of the fourth piece $G_4$ face each other via an oil groove 5. A third oil groove 53 is formed by this combination $T_2$ (see FIG. 11B). The third oil groove 53 has a wide part 53w having a wide groove width, which is formed by the notch part 43L (see FIGS. 4A to 4C) of the third piece $G_3$ and the notch part 44L (see FIGS. 5A to 5C) of the fourth piece $G_4$, on the outer peripheral side $S_O$ and a narrow part 53n having a narrow groove width on the inner peripheral side $S_1$. By virtue of the third oil groove 53, when the wet friction member 1 rotates counterclockwise, the lubricating oil having run on the surface of the third piece $G_3$ can be discharged through the notch part 43L. Further, when it rotates clockwise, the lubricating oil having run on the surface of the fourth piece $G_4$ can be discharged through the notch part 44L. Therefore, it is possible to prevent the lubricating oil from staying on the surface of the segment piece to cause excessive lubricating oil drag, thereby reducing the drag torque.

The friction part 3 of the wet friction member 1 of the second invention may include both of the combination $T_1$ and the combination $T_2$ as itself. The numbers of the combinations $T_1$ and $T_2$ are not limited. For example, the numbers of the combinations $T_1$ and the combinations $T_2$ included in the friction part 3 may be identical with or different from each other. In the case where the friction part 3 includes different numbers of the combinations $T_1$ and the combination $T_2$, for example, it is possible to include the combinations $T_2$ twice as many as the combinations $T_1$.

Also, the arrangement of the combinations is also not limited. For example, the combination $T_1$ and the combination $T_2$ may be arranged with some segment piece being interposed therebetween. Alternatively, the combination $T_1$ and the combination $T_2$ may be arranged adjacent to each other without interposing any other segment piece therebetween. Between these arrangements, it is preferable that the combination $T_1$ and the combination $T_2$ be arranged adjacent to each other without interposing any another segment piece.

Specifically, as illustrated in FIGS. 1A and 1B, the friction part 3 can have repeatedly the combinations $T_1$ and $T_2$ adjacent to each other. That is, the friction part 3 can have repeatedly the adjacent combinations $T_1$ and $T_2$ as a set.

Further, as illustrated in FIG. 10, the friction part 3 can have the combination $T_2$, the combination $T_1$ and the combination $T_2$ adjacent in this order.

When the combination $T_1$ and the combination $T_2$ are arranged adjacent to each other in this manner, the first oil groove 51 and the third oil groove 53 are arranged adjacent to each other. In this case, a particularly high drag torque reduction effect can be obtained. The mechanism is not clear, but is as described above for the wet friction member of the first invention.

Specifically, the drag torque can be reduced by using the first oil groove 51 having the wide part 51w with a wide groove width to cause the lubricating oil to run on the surface of the first piece $G_1$ or the second piece $G_2$, thereby peeling off the wet friction member 1 and the mating member from each other. Further, as the wet friction member 1 rotates, the lubricating oil having run on the surface of the first piece $G_1$ is moved to the surface of the fourth piece $G_4$, and the lubricating oil having run on the surface of the second piece $G_2$ is moved to the third piece $G_3$. However, since the third oil groove 53 having the wide part 53w with a wide groove width is arranged adjacent to the first oil groove 51, the lubricating oil which has been moved to the surfaces of these segment pieces can be discharged from the third oil groove 53 to the outer peripheral side $S_O$. Therefore, it is considered possible to effectively utilize the drag torque reduction due to the peeling-off action of the lubricating oil while suppressing an increase in drag torque due to the lubricating oil drag.

From such a mechanism, each of the combinations preferably includes at least one of an arrangement order of the combination $T_2$, the combination $T_1$ and the combination $T_2$ (see "$T_2$-$T_1$-$T_2$" in FIG. 12A) and an arrangement order of the combination $T_1$, the combination $T_2$ and combination $T_1$ (see "$T_1$-$T_2$-$T_1$" in FIG. 12B). The inclusion of the arrangement order can provide more uniform functions both in the clockwise rotation direction and in the counterclockwise rotation direction.

The shapes and preferred forms of the first oil groove 51 and the third oil groove 53 are as explained for the wet friction member of the first invention.

When the combination $T_1$ and the combination $T_2$ are arranged adjacent to each other, the formation of the shapes of the flow paths of the oil groove 52 and the oil groove 54 is as described above. The shapes and preferred forms of the oil grooves are as explained for the wet friction member of the first invention.

As in the case of the wet friction member 1 of the first invention, any other segment piece than the four kinds of segment pieces which are the first piece $G_1$ to the fourth piece $G_4$ can be interposed between the combination $T_1$ and the combination $T_2$, also in the wet friction member 1 of the second invention.

The shape of any other segment piece is not limited. For example, a ninth piece $G_9$ can be indicated as in the case of the wet friction member 1 of the first invention. The ninth piece $G_9$ is an approximately rectangular segment piece 4 without a notch part. The ninth piece $G_9$ may have a shape narrower than those of the first piece $G_1$ to the fourth piece $G_4$ as shown as "$G_{91}$" in FIG. 9, or may have a shape with approximately the same width as those of the first piece $G_1$ to the fourth piece $G_4$, as shown as "$G_{92}$" in FIG. 10.

In the wet friction member 1 of the second invention, the number of the segment pieces 4 arranged on one main surface 2*a* of the core plate 2 is not limited and is the same as in the case of the wet friction member 1 of the first invention.

Further, the structure of the segment piece 4 is not limited and is the same as in the case of the wet friction member 1 of the first invention described above.

Further, the oil groove 5 is as described above, specifically, the respective oil grooves 5 (the first oil groove 51 to the fourth oil groove 54 and the like) described for the wet friction member 1 of the first invention can be similarly provided. The explanations about the oil grooves 5 in the wet friction member 1 of the first invention can also be applied to the shapes, sizes, etc. of the oil grooves 5.

3. Wet Friction Member of Third Invention

A wet friction member 1 of a third invention includes a core plate 2 formed in a flat ring shape and a friction part 3 arranged in a ring shape on a main surface 2*a* of the core plate 2.

Between these, the friction part 3 includes a plurality of segment pieces 4 including four kinds of segment pieces of $G_1$ to $G_4$ and includes a combination 13 and/or a combination $T_4$ below (see FIGS. 13, 1A, 1B, and 10).

($G_1$) a first piece in which the lower right corner of an approximately rectangular piece is notched in an approximately rectangular shape ($G_2$) a second piece in which the lower left corner of an approximately rectangular piece is notched in an approximately rectangular shape ($G_3$) a third piece in which the upper right corner of an approximately rectangular piece is notched in an approximately rectangular shape ($G_4$) a fourth piece in which the upper left corner of an approximately rectangular piece is notched in an approximately rectangular shape ($T_3$) a combination in which the fourth piece, the first piece, the second piece, and the third piece are arranged in this arrangement order via oil grooves ($T_4$) a combination in which the second piece, the third piece, the fourth piece, and the first piece are arranged in this arrangement order via oil grooves 1-1. Core Plate As the core plate 2, the core plate 2 used in the wet friction member 1 of the first invention described above can be applied as it is.

1-2. Friction Part

The friction part 3 is formed of the segment pieces 4 and the oil grooves 5, similarly to the friction part 3 of the wet friction member 1 according to the first invention described above. Specifically, the plurality of segment pieces 4 are formed to be arranged in a ring shape via the oil grooves 5.

Also, the friction part 3 has the function of adjusting the degree of interlocking between the wet friction member 1 and a mating member (for example, separator plate) adjacent thereto depending on the degree of contact therebetween. That is, it similarly has a brake function (braking function) and a torque transmission function with respect to the mating member.

Further, similarly, the friction part 3 may take either the same form or different forms on the front main surface 2*a* and the back main surface 2*a* of the core plate 2.

1-3. Segment Piece

The segment pieces 4 constitute the friction part 3 as described above, and their surfaces serve as friction surfaces. Since the oil grooves 5 are formed to be defined by the segment pieces 4, the shapes of the oil grooves 5 are also determined by the outer shapes of the segment pieces 4 and the arrangement thereof.

The segment pieces 4 used in the wet friction member 1 of the third invention include a plurality of segment pieces 4 including at least four kinds of segment pieces which are a first piece $G_1$, a second piece $G_2$, a third piece $G_3$ and a fourth piece $G_4$.

As the first piece $G_1$, the second piece $G_2$, the third piece $G_3$ and the fourth piece $G_4$ used in the wet friction member 1 of the third invention, the first piece $G_1$, the second piece $G_2$, the third piece $G_3$ and the fourth piece $G_4$ explained for the wet friction members 1 of the first invention can be applied as they are.

Similarly, the first piece $G_1$ and the second piece $G_2$ may be asymmetric to each other but are preferably line-symmetric, in a plan view.

Further, similarly, the third piece $G_3$ and the fourth piece $G_4$ may be asymmetric to each other but are preferably line-symmetric, in a plan view.

Similarly, it is preferable that the maximum widths $W_1$ and the maximum heights $H_1$ of the segment pieces 4 be the same among the four kinds of segment pieces from the first piece $G_1$ to the fourth piece $G_4$, and, furthermore, that the maximum widths $W_2$ and the maximum heights $H_2$ of the notch parts in these segment pieces 4 be the same among the four kinds of segment pieces from the first piece $G_1$ to the fourth piece $G_4$.

The friction part 3 of the wet friction member 1 of the third invention includes at least one of a combination $T_3$ and a combination $T_4$ each of which includes predetermined segment pieces 4 (see FIGS. 14A and 14B).

Between these combinations, the combination $T_3$ (see FIG. 14A) is a combination in which the fourth piece $G_4$, the first piece $G_1$, the second piece $G_2$ and the third piece $G_3$ are arranged in this arrangement order via oil grooves. By this combination $T_3$ (see FIG. 14A), the notch part 44L of the fourth piece $G_4$, the first oil groove 51, and the notch part 43L of the third piece $G_3$ are arranged side by side. The first oil groove 51 is as explained for the wet friction member 1 of the first invention. By virtue of the combination 13, when the wet friction member 1 rotates counterclockwise, the lubricating oil blocked by the notch part 42L (see FIGS. 3A to 3C) can be caused to run on the surface of the second piece $G_2$. The lubricating oil is interposed between the wet friction member 1 and the mating member to peel them off from each other, so that the drag torque can be reduced. Further, at least a part of the lubricating oil having run on the surface of the second piece $G_2$ is considered to be dragged onto the surface of the third piece $G_3$ along with the counterclockwise rotation of the wet friction member 1. However, since the third piece $G_3$ has the notch part 43L at the upper right corner, it is possible to efficiently discharge the lubricating oil through the notch part 43L, and to suppress further lubricating oil drag. As a result, it is possible to effectively reduce the drag torque due to the peeling-off action of the lubricating oil while suppressing the rise in the drag torque due to the lubricating oil drag.

This mechanism can be considered to be similar also when the wet friction member 1 rotates in the reverse direction. Specifically, when the wet friction member 1 rotates clockwise, the lubricating oil blocked by the notch part 41L (see FIGS. 2A to 2C) can be caused to run on the surface of the first piece $G_1$. The lubricating oil is interposed between the wet friction member 1 and the mating member to peel them off from each other, so that the drag torque can be reduced. Further, it is considered that at least a part of the lubricating oil having run on the surface of the first piece $G_1$ is dragged onto the surface of the fourth piece $G_4$ along with the clockwise rotation of the wet friction member 1. However, since the fourth piece $G_4$ has the notch part 44L at the upper left corner, it is possible to efficiently discharge the lubricating oil through the notch part 44L, and to suppress further lubricating oil drag. As a result, it is possible to effectively reduce the drag torque due to the peeling-off action of the lubricating oil while suppressing the rise in the drag torque due to the lubricating oil drag.

On the other hand, the combination $T_4$ (see FIG. 14B) is a combination in which the second piece $G_2$, the third piece $G_3$, the fourth piece $G_4$, and the first piece $G_1$ are arranged in this arrangement order via oil grooves. By this combination $T_4$ (see FIG. 14B), the notch part 42L of the second piece $G_2$, the third oil groove 53, and the notch part 41L of the first piece $G_1$ are arranged side by side. The third oil groove 53 is as explained for the wet friction member 1 of the first invention. By virtue of the combination $T_4$, when the wet friction member 1 rotates counterclockwise, it is possible to block the lubricating oil by the notch part 42L and cause the lubricating oil to run on the surface of the second piece $G_2$, thereby reducing the drag torque, as with the case of the combination $T_3$. Further, the lubricating oil on the surface of the second piece $G_2$ is dragged onto the surface of the third piece $G_3$ along with the counterclockwise rotation of the wet friction member 1, but can be efficiently discharged through the notch part 43L. Thus, it is possible to effectively reduce the drag torque due to the peeling-off action of the lubricating oil while suppressing the rise in the drag torque due to the lubricating oil drag.

This mechanism can be considered to be similar also when the wet friction member 1 rotates in the reverse direction, as in the case of the above-described combination $T_3$.

The friction part 3 of the wet friction member 1 of the third invention may include at least one of the combination $T_3$ and the combination $T_4$ as itself, but may also include both of them at the same time. Further, the number of the combinations $T_3$ or the combination $T_4$ included in the friction part 3 is not limited. When the friction part 3 includes both of the combinations $T_3$ and the combinations $T_4$, for example, the numbers of the combinations $T_3$ and the combinations $T_4$ included in the friction part 3 may be identical with or different from each other.

Also, the arrangement of the combinations is also not limited. For example, the combination $T_3$ and the combination $T_4$ may be arranged with some segment piece being interposed therebetween. Alternatively, the combination $T_3$ and the combination $T_4$ may be arranged adjacent to each other without interposing any other segment piece therebetween. Between these arrangements, it is preferable that the combination $T_3$ and the combination $T_4$ be arranged adjacent to each other without interposing any another segment piece.

Specifically, as illustrated in FIGS. 1A and 1B, the friction part 3 can have continuously (repeatedly) the combinations $T_4$ alone.

Further, as illustrated in FIG. 10, the friction part 3 can have continuously (repeatedly) the combinations $T_3$ alone.

Further, as illustrated in FIG. 13, the friction part 3 can have continuously (repeatedly) the combinations $T_3$ and $T_4$ adjacent to each other.

The shapes and preferred forms of the first oil groove 51 and the third oil groove 53 are as explained for the wet friction member of the first invention.

Also, the formation of the shapes of the flow paths of the oil groove 52 and the oil groove 54 is as described above. The shapes and preferred forms of the oil grooves are as explained for the wet friction member of the first invention.

As in the case of the wet friction member 1 of the first invention, any other segment piece than the four kinds of segment pieces which are the first piece $G_1$ to the fourth piece $G_4$ can be interposed between the combination $T_3$ and the combination 14, also in the wet friction member 1 of the third invention.

In the wet friction member 1 of the third invention, the number of the segment pieces 4 arranged on one main surface 2a of the core plate 2 is not limited and is the same as in the case of the wet friction member 1 of the first invention.

Further, the structure of the segment piece 4 is not limited and is the same as in the case of the wet friction member 1 of the first invention described above.

Further, the oil groove 5 is as described above, specifically, the respective oil grooves 5 (the first oil groove 51 to the fourth oil groove 54 and the like) described for the wet friction member 1 of the first invention can be similarly provided. The explanations about the oil grooves 5 in the wet friction member 1 of the first invention can also be applied to the shapes, sizes, etc. of the oil grooves 5.

4. Wet Friction Member of Fourth Invention

A wet friction member 1 of a fourth invention includes a core plate 2 formed in a flat ring shape and a friction part 3 arranged in a ring shape on a main surface 2a of the core plate 2.

Between them, the friction part 3 has a plurality of segment pieces 4 including segment pieces of $G_5$ and $G_6$ arranged in a ring shape via an oil groove 5 (see FIGS. 15 to 19C).

($G_5$) a fifth piece in which the lower right corner and upper left corner of an approximately rectangular piece are each notched in an approximately rectangular shape ($G_6$) a sixth piece in which the upper right corner and lower left corner of an approximately rectangular piece are each notched in an approximately rectangular shape The fifth piece $G_5$ is a segment piece in which the lower right corner and upper left corner of an approximately rectangular piece are each notched in an approximately rectangular shape (see FIGS. 18A to 18C). That is, it is a segment piece having a notch part $45L_1$ at the lower right corner of an approximately rectangular piece and a notch part $45L_2$ at the upper left corner thereof.

As in the case of the first piece $G_1$ to the fourth piece $G_4$, the fifth piece $G_5$ can be formed only from straight lines, as shown in FIG. 18A. In this case, the fifth piece $G_5$ can include eight sides, i.e., sides 451 to 458.

Further, as shown in FIG. 18B, in the fifth piece $G_5$, the sides 451, 453, 455 and 457 can be formed by curved lines. Specifically, the sides can be formed by curved lines bulging toward the outer peripheral side $S_O$ so as to have a curvature according to the distance from the rotation center P. Further, in order that the oil grooves 5 have an approximately constant groove width, the sides 452 and 456 can be formed by straight lines inclined so that the rotation center P is positioned on the extension line thereof. Further, as shown in FIG. 18C, each corner part of the fifth piece $G_5$ can be chamfered into a curved shape.

The sizes of the notch parts $45L_1$ and $45L_2$ in the fifth piece $G_5$ are not limited. When the maximum width of the fifth piece $G_5$ is $W_1$ and the maximum width of the notch part $45L_1$ of the fifth piece $G_5$ is $W_2$ (see FIG. 17), the fifth piece $G_5$ can satisfy $0.05 \leq W_2/W_1 \leq 0.40$. In this range, an excellent drag torque reduction effect can be obtained. The W2/W1 can be further set to $0.07 \leq W_2/W_1 \leq 0.35$, further $0.09 \leq W_2/W_1 \leq 0.32$, $0.10 \leq W_2/W_1 \leq 0.30$, and $0.11 \leq W_2/W_1 \leq 0.25$, and $0.12 \leq W_2/W_1 \leq 0.20$. The above-described ranges are similar for the notch part $45L_2$ of the fifth piece $G_5$. In each of these ranges, a better drag torque reduction effect can be obtained.

Further, when the maximum height of the fifth piece $G_5$ is $H_1$ and the maximum height of the notch part $45L_1$ of the fifth piece $G_5$ is $H_2$ (see FIG. 17), the fifth piece $G_5$ can satisfy $0.25 \leq H_2/H_1 \leq 0.75$.

In this range, an excellent drag torque reduction effect can be obtained. The $H_2/H_1$ can be further set to $0.10 \leq H_2/H_1 \leq 0.80$, further to $0.15 \leq H_2/H_1 \leq 0.70$, further to $0.20 \leq H_2/H_1 \leq 0.65$, further to $0.22 \leq H_2/H_1 \leq 0.60$, further to $0.24 \leq H_2/H_1 \leq 0.50$, and further to $0.25 \leq H_2/H_1 \leq 0.40$. The above-described ranges are similar for the notch part $45L_2$ of the fifth piece $G_5$. In each of these ranges, a better drag torque reduction effect can be obtained.

The sixth piece $G_6$ is a segment piece in which the upper right corner and lower left corner of an approximately rectangular piece are each notched in an approximately rectangular shape (see FIGS. 19A to 19C). That is, it is a segment piece having a notch part $46L_4$ at the upper right corner of an approximately rectangular piece and a notch part $46L_2$ at the lower left corner thereof.

As shown in FIG. 19A, the sixth piece $G_6$ can be formed only from straight lines. In this case, the sixth piece $G_6$ can include eight sides, i.e., sides 461 to 468.

Further, as shown in FIG. 19B, in the sixth piece $G_6$, the sides 461, 463, 465 and 467 can be formed by curved lines. Specifically, the sides can be formed by curved lines bulging toward the outer peripheral side $S_O$ so as to have a curvature according to the distance from the rotation center P. Further, in order that the oil grooves 5 have an approximately constant groove width, the sides 464 and 468 can be formed by straight lines inclined so that the rotation center P is positioned on the extension line thereof. Further, as shown in FIG. 19C, each corner part of the sixth piece $G_6$ can be chamfered into a curved shape.

Further, the sizes of the notch parts $46L_1$ and $46L_2$ in the sixth piece $G_6$ are not limited, and the descriptions regarding the ratios $W_2/W_1$ and $H_2/H_1$ of the fifth piece $G_5$ can be applied to the sixth piece $G_6$.

The maximum widths $W_1$ and the maximum heights $H_1$ of the fifth pieces $G_5$ and the sixth pieces $G_6$ may be different, but are preferably the same. Further, the maximum widths $W_2$ and the maximum heights $H_2$ of the notch parts of the segment pieces of the fifth piece $G_5$ and the sixth piece $G_6$ may be different, but are preferably the same. In the case where they are the same, it is possible to make uniform the shapes of the oil grooves 5 formed to be defined by the two segment pieces. Therefore, it is possible to more reliably achieve the drag torque reduction while suppressing variations.

In addition, the fifth piece $G_5$ and the sixth piece $G_6$ may be asymmetric to each other but can be line-symmetric, in a plan view (FIGS. 18A to 18C and FIGS. 19A to 19C are each mirror-symmetric). In the case of the line-symmetric shape, since the fifth piece $G_5$ can be used as the sixth piece $G_6$ by reversing the fifth piece $G_5$, the fifth piece $G_5$ and the sixth piece $G_6$ can be manufactured simultaneously by single punching. Therefore, the segment pieces 4 are easily manufactured, which is an excellent cost merit.

The friction part 3 of the wet friction member 1 of the fourth invention includes a combination $T_5$ and a combination $T_6$ each of which includes predetermined segment pieces 4 (see FIGS. 15, 16A, and 16B).

Between these combinations, the combination $T_5$ (see FIG. 16A) is a combination in which the fifth piece $G_5$ and the sixth piece $G_6$ are arranged in such a manner that the right side of the fifth piece $G_5$ and the left side of the sixth piece $G_6$ face each other via an oil groove 5. By the combination $T_5$ (see FIG. 16A), the notch part $45L_2$ of the fifth piece $G_5$, the fifth oil groove 55, and the notch part $46L_1$ of the sixth piece $G_6$ are arranged side by side. This combination $T_5$ provides the same effect as that of the combination $T_3$ in the wet friction member 1 of the third invention.

That is, by virtue of the combination $T_5$ (see FIG. 16A), when the wet friction member 1 rotates counterclockwise, the lubricating oil blocked by the notch part $46L_2$ (see FIGS. 19A to 19C) can be caused to run on the surface of the sixth piece $G_6$. The lubricating oil is interposed between the wet friction member 1 and the mating member to peel them off from each other, so that the drag torque can be reduced. Further, the sixth piece $G_6$ has a notch part $46L_1$ at the upper right corner. Therefore, the lubricating oil having run on the surface of the sixth piece $G_6$ can be efficiently discharged through the notch part $46L_1$ with the counterclockwise rotation of the wet friction member 1. As a result, it is possible to effectively reduce the drag torque due to the peeling-off action of the lubricating oil while suppressing the rise in the drag torque due to the lubricating oil drag.

This mechanism is similar also when the wet friction member 1 rotates in the reverse direction. That is, when the wet friction member 1 rotates clockwise, the lubricating oil blocked by the notch part $45L_1$ (see FIGS. 18A to 18C) can be caused to run on the surface of the fifth piece $G_5$. The lubricating oil is interposed between the wet friction member 1 and the mating member to peel them off from each other, so that the drag torque can be reduced. The fifth piece $G_5$ has a notch part $45L_2$ at the upper left corner. Therefore, the lubricating oil having run on the surface of the fifth piece $G_5$ can be efficiently discharged through the notch part $45L_2$, along with the counterclockwise rotation of the wet friction member 1. As a result, it is possible to effectively reduce the drag torque due to the peeling-off action of the lubricating oil while suppressing the rise in the drag torque due to the lubricating oil drag.

The fifth oil groove 55 described above is an oil groove formed to be defined between the fifth piece $G_5$ and the sixth piece $G_6$ within the combination $T_5$. The fifth oil groove 55 is an oil groove including the notch part 45L$_1$ of the fifth piece $G_5$ and the notch part 46L$_2$ of the sixth piece $G_6$, and has a wide part with a wide groove width on the inner peripheral side $S_I$ and a narrow part having a narrow groove width on the outer peripheral side $S_O$, similarly to the oil groove 51.

In the fifth oil groove 55, the correlation between the width of the narrow part and the width of the wide part is not limited, and the fifth oil groove 55 can be formed in the same shape as that of the oil groove 51. Specifically, when an opening part leading to the outer peripheral side $S_O$ of the narrow part is E55$_O$ and an opening part leading to the inner peripheral side $S_I$ of the wide part is E55$_I$, the opening part E55$_I$ is preferably 1.2 times or more and 10 times or less, more preferably 1.4 times or more and 9 times or less, particularly preferably 1.5 times or more and 8 times or less larger than the opening part E55$_O$. More specifically, the opening width of the opening part E55$_I$ can be set to 1.5 mm or more and 20 mm or less, further to 1.5 mm or more and 15 mm or less, and further to 2 mm or more and 12 mm or less.

On the other hand, the combination $T_6$ (see FIG. 16B) is a combination in which the fifth piece $G_5$ and the sixth piece $G_6$ are arranged in such a manner that the right side of the fifth piece $G_5$ and the left side of the sixth piece $G_6$ face each other via an oil groove 5. By this combination $T_6$ (see FIG. 16B), the notch part 46L$_2$ of the sixth piece $G_6$, the sixth oil groove 56, and the notch part 45L$_1$ of the fifth piece $G_5$ are arranged side by side. This combination $T_6$ provides the same effect as that of the combination $T_4$ in the wet friction member 1 of the third invention.

Specifically, by virtue of the combination $T_6$ (see FIG. 16B), when the wet friction member 1 rotates counterclockwise, the lubricating oil blocked by the notch part 46L$_2$ can be caused to run on the surface of the sixth piece $G_6$. The lubricating oil is interposed between the wet friction member 1 and the mating member to peel them off from each other, so that the drag torque can be reduced. Further, the sixth piece $G_6$ has a notch part 46L$_1$ at the upper right corner. Therefore, the lubricating oil having run on the surface of the sixth piece $G_6$ can be efficiently discharged through the notch part 46L$_1$, that is, from the sixth oil groove 56, along with the counterclockwise rotation of the wet friction member 1. As a result, it is possible to effectively reduce the drag torque due to the peeling-off action of the lubricating oil while suppressing the rise in the drag torque due to the lubricating oil drag.

Similarly, when the wet friction member 1 rotates clockwise, the lubricating oil blocked by the notch part 45L$_1$ can be caused to run on the surface of the fifth piece $G_5$. The lubricating oil is interposed between the wet friction member 1 and the mating member to peel them off from each other, so that the drag torque can be reduced. The fifth piece $G_5$ has a notch part 45L$_2$ at the upper left corner. Therefore, the lubricating oil having run on the surface of the fifth piece $G_5$, can be efficiently discharged through the notch part 45L$_2$, that is, from the sixth oil groove 56, along with the clockwise rotation of the wet friction member 1. As a result, it is possible to effectively reduce the drag torque due to the peeling-off action of the lubricating oil while suppressing the rise in the drag torque due to the lubricating oil drag.

The friction part 3 of the wet friction member 1 of the fourth invention has only to include the combinations $T_5$ and the combinations $T_6$, and the numbers of the combinations $T_5$ and the combinations $T_6$ included in the friction part 3 are not limited.

Also, the arrangement of the combinations is also not limited. For example, the combination $T_5$ and the combination $T_6$ may be arranged with some segment piece being interposed therebetween. Alternatively, the combination $T_5$ and the combination $T_6$ may be arranged adjacent to each other without interposing any other segment piece therebetween. Between these arrangements, it is preferable that the combination $T_5$ and the combination $T_6$ be arranged adjacent to each other without interposing any another segment piece.

Specifically, as illustrated in FIG. 15, the friction part 3 can have continuously (repeatedly) the combinations $T_5$ and $T_6$ adjacent to each other.

Also in the wet friction member 1 of the fourth invention, as in the case of the wet friction member 1 of the first invention, the four kinds of segment pieces which are the first piece $G_1$ to the fourth piece $G_4$ or any other segment piece than these segment pieces can be interposed between the combination $T_5$ and the combination $T_6$.

In the case where the wet friction member 1 is provided with any other segment piece, it can be provided with an oil groove 5 other than the fifth oil groove 55 and the sixth oil groove 56. As such other oil grooves 5, the second oil groove 52, the fourth oil groove 54, and the like are indicated as described above. Their shapes, sizes and the like are also as explained for the oil grooves 5 in the wet friction member 1 of the first invention.

Furthermore, in the wet friction member 1 of the fourth invention, the number of the segment pieces 4 arranged on one main surface 2a of the core plate 2 is not limited, as in the case of the wet friction member 1 of the first invention.

Further, the structure of the segment piece 4 is not limited and is the same as in the case of the wet friction member 1 of the first invention described above.

As the four kinds of segment pieces which are the first piece $G_1$ to the fourth piece $G_4$ or any other segment pieces than these segment pieces, the following seventh piece $G_7$ and eighth piece $G_8$ are indicated, in addition to the above-mentioned ninth piece $G_9$.

The seventh piece $G_7$ is a segment piece in which the lower right corner and lower left corner of an approximately rectangular piece are each notched in an approximately rectangular shape (see FIGS. 20A to 20C). That is, the segment piece has a notch part 47L$_1$ at the lower right corner of an approximately rectangular piece and further has a notch part 47L$_2$ at the lower left corner thereof.

As shown in FIG. 20A, this seventh piece $G_7$ can be formed only from straight lines. In this case, the seventh piece $G_7$ can include eight sides, i.e., sides 471 to 478.

Further, as shown in FIG. 20B, in the seventh piece $G_7$, the sides 471, 473, 475 and 477 can be formed by curved lines. Specifically, the sides can be formed by curved lines bulging toward the outer peripheral side $S_O$ so as to have a curvature according to the distance from the rotation center P. Further, in order that the oil grooves 5 have an approximately constant groove width, the sides 472 and 476 can be formed by straight lines inclined so that the rotation center P is positioned on the extension line thereof. Furthermore, as shown in FIG. 20C, each corner part of the seventh piece $G_7$ can be chamfered into a curved shape.

The sizes of the notch parts $47L_1$ and $47L_2$ in the seventh piece $G_7$ are not limited, and the descriptions regarding the ratios $W_2/W_1$ and $H_2/H_1$ of the fifth piece $G_5$ can be directly applied to the seventh piece $G_7$.

The eighth piece $G_8$ is a segment piece in which the upper right corner and upper left corner of an approximately rectangular piece are each notched in an approximately rectangular shape (see FIGS. 21A to 21C). That is, the segment piece has a notch part $48L_1$ at the upper right corner of an approximately rectangular piece, and further has a notch part $48L_2$ at the upper left corner thereof.

As shown in FIG. 21A, the eighth piece $G_8$ can be formed from only a straight line. In this case, the eighth piece $G_5$ can include eight sides, i.e., sides 481 to 488.

Further, as shown in FIG. 21B, in the eighth piece $G_8$, the sides 481, 483, 485 and 487 can be formed by curved lines. Specifically, the sides can be formed by curved lines bulging toward the outer peripheral side $S_O$ so as to have a curvature according to the distance from the rotation center P. Furthermore, in order that the oil grooves 5 have an approximately constant groove width, the sides 484 and 488 can be formed by straight lines inclined so that the rotation center P is positioned on the extension line thereof. Further, as shown in FIG. 21C, each corner part of the eighth piece $G_8$ can be chamfered into a curved shape.

Further, the sizes of the notch parts $48L_1$ and $48L_2$ in the eighth piece $G_8$ are not limited, and the description regarding $W_2/W_1$ and $H_2/H_1$ regarding the fifth piece $G_5$ can be directly applied to the eighth piece $G_8$.

EXAMPLES

Hereinafter, the present invention will be explained by way of examples. Explanations common to the examples will be omitted.

1. Adjustment of Wet Friction Member

Example 1

A wet friction member of Example 1 was obtained using the following elements (see FIGS. 1A and 1B).

A core plate 2 is in a flat ring shape (outer diameter $R_1$=158 mm, inner diameter $R_2$=144 mm, ratio $R_1/R_2$=1.10) and has spline teeth 8 (engagement teeth 8) protruding from the inner periphery. The following segment pieces 4 were joined to both main surfaces $2a$ (front main surface $2a$ and hack main surface $2a$) of the core plate 2 to obtain a wet friction member of Example 1.

The segment pieces 4 are configured in such a manner that a plurality of segment pieces are arranged in a ring shape with oil grooves interposed therebetween.

As the segment pieces 4, the following four different kinds of segment pieces (first piece $G_1$ to fourth piece $G_4$) were used:

first piece $G_1$: a segment piece in which the lower right corner of an approximately rectangular piece was notched in an approximately rectangular shape (see FIG. 2C);

second piece $G_2$: a segment piece in which the lower right corner of an approximately rectangular piece was notched in an approximately rectangular shape (see FIG. 3C);

third piece $G_3$: segment piece (see FIG. 4C) in which the lower right corner having an approximately rectangular piece was notched in an approximately rectangular shape; and fourth piece $G_4$: a segment piece in which the lower right corner of an approximately rectangular piece was notched in an approximately rectangular shape (see FIG. 5C).

Provided that the dimensions of the respective parts of the respective segment pieces are as follows.

Maximum width $W_1$ of segment piece=9.6 mm
Maximum height $H_1$ of segment piece=8.9 mm
Maximum width $W_2$ of notch part=2.5 mm
Maximum height $H_2$ of notch part=5.0 mm In addition, the second piece $G_2$ is mirror-symmetric, and the first piece $G_1$ is reversed so as to be used as the second piece $G_2$. Likewise, the fourth piece $G_4$ is mirror-symmetric, and the third piece $G_3$ is reversed so as to be used as the fourth piece $G_4$.

The segment pieces consist only of four kinds of pieces from the first piece $G_1$ to the fourth piece $G_4$. These segment pieces arranged clockwise in an order of the first piece $G_1$, the second piece $G_2$, the third piece $G_3$ and the fourth piece $G_4$ were set as one group. This group was repeated 10 times to form a friction part 3 consisting of 40 segment pieces (group of four kinds of segment pieces×10). The respective segment pieces are opposed via oil grooves. That is, oil grooves are arranged among all the adjacent segment pieces. Therefore, the friction part 3 on one main surface $2a$ includes 40 segment pieces and 40 oil grooves, and the friction parts 3 of the same arrangement are formed on both the front main surface $2a$ and the hack main surface $2a$.

Therefore, the friction part 3 of Example 1 has an arrangement order peculiar to the wet friction member 1 of the first invention. Further, the friction part 3 of Example 1 has both combinations $T_1$ and $T_2$ peculiar to the wet friction member 1 of the second invention, and also has both an arrangement order $T_2$-$T_1$-$T_2$ and an arrangement order $T_1$-$T_2$-$T_1$. Furthermore, the friction part 3 of Example 1 has both combinations $T_3$ and $T_4$ peculiar to the wet friction member 1 of the third invention.

In addition, in the wet friction member 1 of Example 1, the opening widths of the respective oil grooves are as follows.

Opening width of opening part $E51_I$ of oil groove 51=7 mm
Opening width of opening part $E51_O$ of oil groove 51=2 mm
Opening width of opening part $E52_I$ of oil groove 52=2 mm
Opening width of opening part $E52_O$ of oil groove 52=2 mm
Opening width of opening part $E53_I$ of oil groove 53=2 mm
Opening width of opening part $E53_O$ of oil groove 53=7 mm
Opening width of opening part $E54_I$ of oil groove 54=2 mm
Opening width of opening part $E54_O$ of oil groove 54=2 mm Each of the segment pieces 4 is formed by making a paper body from fiber bases such as pulp and an aramid fiber, a friction modifier such as cashew dust, a filler such as diatomaceous earth and impregnating the paper body with a curable resin to cure the paper body. The respective segment pieces 4 are joined to the main surfaces $2a$ of the core plate 2 by pressurizing and heating.

Example 2

A wet friction member of Example 2 was obtained using the following elements (see FIG. 10).

The core plate 2 is identical with that used in Example 1. The segment pieces 4 are configured in such a manner that a plurality of segment pieces are arranged in a ring shape with oil grooves interposed therebetween.

As the segment pieces 4, the following five different kinds of segment pieces (the first piece $G_1$, the second piece $G_2$, the third piece $G_3$, the fourth piece $G_4$ and the ninth piece $G_9$) were used:

first piece $G_1$: identical with that of Example 1;
second piece $G_2$: identical with that of Example 1;
third piece $G_3$: identical with that of Example 1;
fourth piece $G_4$: identical with that of Example 1; and
ninth piece $G_9$: an approximately rectangular piece (the same width and the same height as those of the first piece to the fourth piece).

Provided that the dimensions of the respective parts of the respective segment pieces are as follows.

Maximum width $W_1$ of segment piece=9.6 mm
Maximum height $H_1$ of segment piece=8.9 mm
Maximum width $W_2$ of notch part=2.5 mm
Maximum height $H_2$ of notch part=5.0 mm Incidentally, the second piece $G_2$ is mirror-symmetric, and the first piece $G_1$ is reversed to be used as the second piece $G_2$. Likewise, the fourth piece $G_4$ is mirror-symmetric, and the third piece $G_3$ is reversed so as to be used as the fourth piece $G_4$.

The segment pieces arranged in an order of the third piece $G_3$, the fourth piece $G_4$, the first piece $G_1$, the second piece $G_2$, the third piece $G_3$, the fourth piece $G_4$, the ninth piece $G_9$ ($G_{92}$) and the ninth piece $G_9$ ($G_{92}$) were set as one group. This group was repeated 5 times to form a friction part 3 consisting of 40 segment pieces. The respective segment pieces are opposed via oil grooves. That is, oil grooves are arranged among all the adjacent segment pieces. Therefore, the friction part 3 on one main surface 2a includes 40 segment pieces and 40 oil grooves, and the friction parts 3 of the same arrangement are formed on both the front main surface 2a and the back main surface 2a.

Therefore, the friction part 3 of Example 2 has both combinations $T_1$ and $T_2$ peculiar to the wet friction member 1 of the second invention, and also has an arrangement order $T_2$-$T_1$-$T_2$. Furthermore, the friction part 3 of Example 2 has a combination $T_3$ specific to the wet friction member 1 of the third invention.

In addition, in the wet friction member 1 of Example 2, the opening widths of the respective oil grooves are as follows.

The shape of the oil groove 51 is the same as that of the oil groove 51 of Example 1.
The shape of the oil groove 52 is the same as that of the oil groove 52 of Example 1.
The shape of the oil groove 53 is the same as that of the oil groove 53 of Example 1.
The shape of the oil groove 54 is the same as that of the oil groove 54 of Example 1.
Opening widths on outer peripheral side and inner peripheral side of oil groove 541=2 mm
Opening widths on outer peripheral side and inner peripheral side of oil groove 59=2 mm
Opening widths on outer peripheral side and inner peripheral side of oil groove 522=2 mm The material configuration of each of the segment pieces 4 is identical with that of Example 1.

Comparative Example 1

A wet friction member of Comparative Example 1 was obtained using the following elements (see FIG. 22).

The core plate 2 is identical with that used in Example 1. The segment pieces 4 are configured in such a manner that a plurality of segment pieces are arranged in a ring shape with oil grooves interposed therebetween.

As the segment pieces 4, the following three different kinds of segment pieces (the first piece $G_1$, the second piece $G_2$ and the ninth piece $G_9$) were used:

first piece $G_1$: identical with that of Example 1;
second piece $G_2$: identical with that of Example 1;
ninth piece $G_9$: an approximately rectangular piece (the same width and the same height as those of the first piece to the fourth piece).

Provided that the dimensions of the respective parts of the respective segment pieces are as follows.

Maximum width $W_1$ of segment piece=9.6 mm
Maximum height $H_1$ of segment piece=8.9 mm
Maximum width $W_2$ of notch part=2.5 mm
Maximum height $H_2$ of notch part=5.0 mm Incidentally, the second piece $G_2$ is mirror-symmetric, and the first piece $G_1$ is reversed to be used as the second piece $G_2$.

The segment pieces arranged in an order of the ninth piece $G_9$ ($G_{92}$), the first piece $G_1$, the second piece $G_2$ and the ninth piece $G_9$ ($G_{92}$) was set as one group. This group was repeated 10 times to form a friction part 3 consisting of 40 segment pieces. The respective segment pieces are opposed via oil grooves. That is, oil grooves are arranged among all the adjacent segment pieces. Therefore, the friction part 3 on one main surface 2a includes 40 segment pieces and 40 oil grooves, and the friction parts 3 of the same arrangement are formed on both the front main surface 2a and the back main surface 2a.

In addition, in the wet friction member 1 of Comparative Example 1, the opening widths of the respective oil grooves are as follows.

Opening width of opening part $E51_I$ of oil groove 51=7 mm
Opening width of opening part $E51_O$ of oil groove 51=2 mm
Opening widths of inner peripheral sides $S_I$ of other oil grooves=2 mm
Opening widths of outer peripheral sides $S_O$ of other oil grooves=2 mm The material configuration of each of the segment pieces 4 is identical with that of Example 1.

Comparative Example 2

A wet friction member of Comparative Example 2 was obtained using the following elements (see FIG. 23).

The core plate 2 is identical with that used in Example 1. The segment pieces 4 are configured in such a manner that a plurality of segment pieces are arranged in a ring shape with oil grooves interposed therebetween.

As the segment pieces 4, the following two different kinds of segment pieces (ninth piece $G_9$ and tenth piece $G_{10}$) were used:

ninth piece $G_9$: identical with that of Comparative Example 1; and
tenth piece $G_{10}$: a piece in which the inner peripheral side $S_I$ of the ninth piece $G_9$ was cut 5.0 mm from the lower end.

Provided that the dimensions of the respective parts of the respective segment pieces are as follows.

Maximum width $W_1$ of segment piece=9.6 mm
Maximum height $H_1$ of segment piece=8.9 mm
Maximum height $H_2$ of notch part=5.0 mm The segment pieces arranged in an order of the tenth piece $G_{10}$, the ninth piece $G_9$ ($G_{92}$), the ninth piece $G_9$ ($G_{92}$) and the ninth piece $G_9$ ($G_{92}$) were set as one group. This group was repeated 10 times to form a friction part 3 consisting of 40 segment pieces. The respective segment pieces are opposed via oil grooves. That is, oil grooves are arranged among all the adjacent segment pieces. Therefore, the friction part 3 on one main surface 2a includes 40 segment pieces and 40 oil grooves, and the friction parts 3 of the same arrangement are formed on both the front main surface 2a and the back main surface 2a.

In addition, in the wet friction member 1 of Comparative Example 2, the opening widths of the respective oil grooves are as follows.

Opening width of inner peripheral side $S_I$ of each oil groove=2 mm
Opening width of outer peripheral side $S_O$ of each oil groove=2 mm The material configuration of each of the segment pieces 4 is identical with that of Example 1.

2. Measurement of Drag Torque

Four wet friction members each according to Examples 1 and 2 and Comparative Examples 1 and 2 in the above item [1] were used to measure the drag torque with an SAE friction tester at a rotation speed between 500 and 3000 rpm under the following conditions. The obtained results are shown in a graph in FIG. 24 (FIG. 24 shows that the drag torque is larger toward the upper side of the vertical axis).

Four wet friction members as test specimens were set in an environment using AutoAtic Transmission Fluid ("ATF" is a registered trademark of Idemitsu Kosan Co., Ltd., but is used hereinafter as its abbreviation regardless of this registered trademark) (oil temperature: 40° C., ATF oil amount: 1000 mL/min (shaft center lubrication) and pack clearance: 0.20 mm/sheet). The rotation speed was changed to between 500 rpm and 3000 rpm to measure the drag torques (N·m) at six points, i.e., 500 rpm, 1000 rpm, 1500 rpm, 2000 rpm, 2500 rpm and 3000 rpm.

3. Effects of Examples

From the result of FIG. 24, it can be seen that the structure of Comparative Example 1 (forms of JP 2001-295859 A and JP 2005-282648 A) gives a larger drag torque in a region where the relative rotation speed is low, than the drag torque in a region where the relative rotation speed is high. On the other hand, it can be seen that the structure of Comparative Example 2 (form of JP 2016-098901 A) can give a reduced drag torque in the region where the relative rotation speed is low. On the other hand, it can be seen that the structure of Example 2 can give a further drastically reduction in drag torque in the region where the relative rotation speed is low, as compared with the structures of Comparative Example 1 and Comparative Example 2, and, additionally, can give a reduction in drag torque in the region where the relative rotation speed is high. Furthermore, it can be seen that the structure of Example 1 can give a further significant reduction in drag torque in the region where the relative rotation speed is low as compared with the structures of Comparative Example 1 and Comparative Example 2, and, additionally, can give a reduction in drag torque in the region where the relative rotation speed is high, and thus can achieve a more flat drag torque as a whole. Further, it can be understood that the drag torque in the region where the relative rotation speed is low can be further reduced even when compared with the structure of Example 2.

The present invention is not limited to the above-described specific examples, and can be variously modified within the scope of the present invention depending on the purpose and intended use.

The intended use of the wet friction member according to the present invention is not particularly limited, and the wet friction member is widely applied to automobiles (four-wheeled vehicles, two-wheeled vehicles, etc.), railway vehicles, ships, airplanes, and the like. Among them, the wet friction member is suitably used for automatic transmissions (automatic transmissions, ATs) as automobile supplies. Only one wet friction member may be used in the transmissions, or a plurality of them may be used therein. However, it is preferable that a plurality of wet friction members be used. The use of a larger number of wet friction members in one transmission can provide a cumulatively large effect. That is, the drag torque can be more effectively reduced in a wet multiple disc clutch including a larger number of wet friction members.

What is claimed is:

1. A wet friction member comprising:
a core plate formed in a flat ring shape; and
a friction part arranged on a main surface of the core plate,
wherein the friction part is formed in such a manner that four kinds of segment pieces, which are the following pieces ($G_1$) to ($G_4$), are arranged in a ring shape via oil grooves:
($G_1$) a first piece in which a lower right corner of an approximately rectangular piece is notched in an approximately rectangular shape:
($G_2$) a second piece in which a lower left corner of an approximately rectangular piece is notched in an approximately rectangular shape:
($G_3$) a third piece in which an upper right corner of an approximately rectangular piece is notched in an approximately rectangular shape; and
($G_4$) a fourth piece in which an upper left corner of an approximately rectangular piece is notched in an approximately rectangular shape, and
wherein the segment pieces are repeatedly arranged in an arrangement order of the first piece, the second piece, the third piece, and the fourth piece.

2. The wet friction member according to claim 1, wherein,
when an oil groove defined by the second piece and the third piece which are adjacent to each other is defined as a second oil groove and
when an oil groove defined by the first piece and the fourth piece which are adjacent to each other is defined as a fourth oil groove,
the second oil groove and the fourth oil groove are each provided with a straight channel between an inner peripheral-side opening part and an outer peripheral-side opening part, the straight channel having an approximately constant groove width and also having a flow path which runs straight toward a rotation center of the wet friction member.

3. The wet friction member according to claim 1, wherein,
when an oil groove defined by the first piece and the second piece which are adjacent to each other is defined as a first oil groove and when an oil groove defined by the third piece and the fourth piece which are adjacent to each other is defined as a third oil groove, the first oil groove and the third oil groove each have a wide part having a wide groove width and a narrow part having a narrow groove width, and the wide part has, on one end side, an opening part leading to the inner peripheral side or outer peripheral side and has, on another end side, a connection part leading to the narrow part, and is provided with a straight channel between the opening part and the connection part, the straight channel having a constant groove width and also having a flow path which runs straight toward a rotation center of the wet friction member.

4. The wet friction member according to claim 1, wherein the first piece and the second piece are line-symmetric and the third piece and the fourth piece are line-symmetric, in a plan view.

5. The wet friction member according to claim 1, wherein all of the segment pieces ($G_1$) to ($G_4$) satisfy $0.10 \leq W_2/W_1 \leq 0.80$, when a maximum width thereof is $W_1$ and the maximum width of notch parts thereof is $W_2$.

6. The wet friction member according to claim 1, wherein all of the segment pieces ($G_1$) to ($G_4$) satisfy $0.25 \leq H_2/H_1 \leq 0.75$, when a maximum height thereof is $H_1$ and the maximum height of notch parts thereof is $H_2$.

7. A wet friction member comprising:

a core plate formed in a flat ring shape; and a friction part arranged in a ring shape on a main surface of the core plate, wherein the friction part includes:

a plurality of segment pieces including segment pieces ($G_1$) to ($G_4$):

($G_1$) a first piece in which a lower right corner of an approximately rectangular piece is notched in an approximately rectangular shape;

($G_2$) a second piece in which a lower left corner of an approximately rectangular piece is notched in an approximately rectangular shape;

($G_3$) a third piece in which an upper right corner of an approximately rectangular piece is notched in an approximately rectangular shape; and ($G_4$) a fourth piece in which an upper left corner of an approximately rectangular piece is notched in an approximately rectangular shape; and the following combinations ($T_1$) and ($T_2$):

($T_1$) a combination in which the first piece and the second piece are arranged in such a manner that a right side of the first piece and a left side of the second piece face each other via an oil groove; and ($T_2$) a combination in which the third piece and the fourth piece are arranged in such a manner that a right side of the third piece and a left side of the fourth piece face each other via an oil groove.

8. The wet friction member according to claim 7, which includes at least one of an arrangement order of the combination ($T_2$), the combination ($T_1$) and the combination ($T_2$) and an arrangement order of the combination ($T_1$), the combination ($T_2$) and the combination ($T_1$).

9. A wet friction member comprising:

a core plate formed in a flat ring shape; and a friction part arranged in a ring shape on a main surface of the core plate, wherein the friction part includes:

a plurality of segment pieces including segment pieces ($G_1$) to ($G_4$):

($G_1$) a first piece in which a lower right corner of an approximately rectangular piece is notched in an approximately rectangular shape;

($G_2$) a second piece in which a lower left corner of an approximately rectangular piece is notched in an approximately rectangular shape:

($G_3$) a third piece in which an upper right corner of an approximately rectangular piece is notched in an approximately rectangular shape; and ($G_4$) a fourth piece in which an upper left corner of an approximately rectangular piece is notched in an approximately rectangular shape; and the following combination ($T_3$) and/or the following combination ($T_4$);

($T_3$) a combination in which the fourth piece, the first piece, the second piece and the third piece are arranged in this arrangement order via oil grooves; and ($T_4$) a combination in which the second piece, the third piece, the fourth piece and the first piece are arranged in this arrangement order via oil grooves.

10. A wet friction member comprising:

a core plate formed in a flat ring shape; and a friction part arranged in a ring shape on a main surface of the core plate, wherein the friction part includes a plurality of segment pieces arranged in a ring shape via an oil groove, the plurality of segment pieces including segment pieces ($G_5$) and ($G_6$):

($G_5$) a fifth piece in which a lower right corner and an upper left corner of an approximately rectangular piece are each removed in an approximately rectangular shape; and ($G_6$) a sixth piece in which an upper right corner and a lower left corner of an approximately rectangular piece are each removed in an approximately rectangular shape.

11. The wet friction member according to claim 10, wherein the friction part includes at least one of the following combinations ($T_5$) and ($T_6$):

($T_5$) a combination in which the fifth piece and the sixth piece are arranged in such a manner that a right side of the fifth piece and a left side of the sixth piece face each other via an oil groove; and ($T_6$) a combination in which the fifth piece and the sixth piece are arranged in such a manner that a left side of the fifth piece and a right side of the sixth piece face each other via an oil groove.

12. The wet friction member according to claim 10, wherein both of the segment pieces ($G_5$) and ($G_6$) satisfy $0.05 \leq W_2/W_1 \leq 0.40$, when a maximum width thereof is $W_1$ and the maximum width of one of removed parts thereof is $W_2$.

13. The wet friction member according to claim 10, wherein both of the segment pieces ($G_5$) and ($G_5$) satisfy $0.25 \leq H_2/H_1 \leq 0.75$, when a maximum height thereof is $H_1$ and the maximum height of one of removed parts thereof is $H_2$.

14. The wet friction member according to claim 10, wherein
  the lower right corner of the fifth piece is removed to form a notch part opened to an inner peripheral side and the upper left corner of the fifth piece is removed to form a notch part opened to an outer peripheral side, and
  the upper right corner of the sixth piece is removed to form a notch part opened to the outer peripheral side and the lower left corner of the sixth piece is removed to form a notch part opened to the inner peripheral side.

* * * * *